US010528681B2

(12) United States Patent
Yogeswaren

(10) Patent No.: US 10,528,681 B2
(45) Date of Patent: Jan. 7, 2020

(54) METHODS AND SYSTEMS FOR CONSTRUCTING AND USING A SUBTERRANEAN GEOMECHANICS MODEL SPANNING LOCAL TO ZONAL SCALE IN COMPLEX GEOLOGICAL ENVIRONMENTS

(71) Applicant: Geoscale, Inc., Houston, TX (US)

(72) Inventor: Elan Yogeswaren, Houston, TX (US)

(73) Assignee: GeoScale, Inc., Houston, TX (US)

( * ) Notice: Subject to any disclaimer, the term of this patent is extended or adjusted under 35 U.S.C. 154(b) by 715 days.

(21) Appl. No.: 13/732,511

(22) Filed: Jan. 2, 2013

(65) Prior Publication Data

US 2013/0138410 A1    May 30, 2013

Related U.S. Application Data

(63) Continuation-in-part of application No. 12/616,026, filed on Nov. 10, 2009, now Pat. No. 8,374,836.

(60) Provisional application No. 61/113,853, filed on Nov. 12, 2008.

(51) Int. Cl.
*G06F 17/50* (2006.01)
*G01V 11/00* (2006.01)
*G01V 1/28* (2006.01)
*G01V 99/00* (2009.01)

(52) U.S. Cl.
CPC .......... *G06F 17/5009* (2013.01); *G01V 1/284* (2013.01); *G01V 11/00* (2013.01); *G01V 99/005* (2013.01); *G01V 2210/6222* (2013.01); *G01V 2210/66* (2013.01); *G01V 2210/665* (2013.01); *G01V 2210/6652* (2013.01); *G06F 2217/16* (2013.01)

(58) Field of Classification Search
CPC .... G06F 17/5009; G01V 1/284; G01V 11/00; G01V 99/005
USPC .......................................................... 703/10
See application file for complete search history.

(56) References Cited

U.S. PATENT DOCUMENTS

| | | | | |
|---|---|---|---|---|
| 5,128,866 A | * | 7/1992 | Weakley ................. | E21B 21/08 367/73 |
| 7,177,764 B2 | | 2/2007 | Stone | |
| 7,584,081 B2 | * | 9/2009 | Wen ........................ | E21B 43/00 703/2 |

(Continued)

OTHER PUBLICATIONS

Kasap et al.("Estimating a Relationship Between Pore Pressure and Natural Fracture Permeability for Highly Stressed Reservoirs", SPE, 2003, pp. 1-8).*

(Continued)

*Primary Examiner* — Kamini S Shah
*Assistant Examiner* — Iftekhar A Khan
(74) *Attorney, Agent, or Firm* — Norton Rose Fulbright US LLP

(57) ABSTRACT

In an exemplary embodiment, a method and system is disclosed for developing a subterranean geomechanics model of a complex geological environment. The method can include estimating a pore pressure field, a stress field, a geomechanics property field, and a geological structure field from a geological concept model; geostatistically interpolating vectors and tensors from the estimated fields; and combining the results from the estimated fields and the geostatistically interpolated vectors and tensors to derive a geostatistical geomechanical model of the geological environment.

19 Claims, 8 Drawing Sheets

(56) References Cited

U.S. PATENT DOCUMENTS

| | | | | |
|---|---|---|---|---|
| 8,004,932 B2* | 8/2011 | Zheng | G01V 1/44 | 367/32 |
| 8,374,836 B2* | 2/2013 | Yogeswaren | G01V 11/00 | 703/10 |
| 8,938,363 B2* | 1/2015 | Beasley | E21B 43/26 | 166/308.1 |
| 9,372,943 B2* | 6/2016 | Li | G06F 17/5009 | |
| 2003/0078733 A1* | 4/2003 | Stone | G01V 11/00 | 702/13 |
| 2004/0199329 A1* | 10/2004 | Stone | G01V 11/00 | 702/13 |
| 2005/0065730 A1* | 3/2005 | Sinha | G01V 1/50 | 702/7 |
| 2005/0125209 A1* | 6/2005 | Soliman | E21B 43/26 | 703/10 |
| 2005/0234690 A1* | 10/2005 | Mainguy | G01V 1/282 | 703/10 |
| 2006/0129366 A1 | 6/2006 | Shaw | | |
| 2007/0143020 A1* | 6/2007 | Bradford | E21B 47/026 | 702/6 |
| 2007/0183259 A1* | 8/2007 | Yogeswaren | G01V 1/44 | 367/25 |
| 2007/0183853 A1 | 8/2007 | Yogeswaren et al. | | |
| 2007/0294034 A1* | 12/2007 | Bratton | E21B 41/00 | 702/6 |
| 2008/0033656 A1* | 2/2008 | Herwanger | E21B 41/0064 | 702/18 |
| 2008/0033704 A1* | 2/2008 | Sayers | E21B 7/04 | 703/10 |
| 2008/0087423 A1* | 4/2008 | Wylie | C09K 8/12 | 166/254.2 |
| 2008/0288172 A1* | 11/2008 | Stone | G01V 11/00 | 702/13 |
| 2008/0288226 A1* | 11/2008 | Gurpinar | E21B 43/00 | 703/10 |
| 2008/0319675 A1* | 12/2008 | Sayers | G01V 1/50 | 702/11 |
| 2009/0065252 A1* | 3/2009 | Moos | E21B 7/06 | 175/50 |
| 2009/0303834 A1* | 12/2009 | Sengupta | G01V 1/303 | 367/73 |
| 2010/0121622 A1* | 5/2010 | Shi | G01V 11/00 | 703/2 |
| 2010/0121623 A1* | 5/2010 | Yogeswaren | G01V 11/00 | 703/2 |
| 2010/0191511 A1* | 7/2010 | Hsu | E21B 49/006 | 703/1 |
| 2010/0250214 A1* | 9/2010 | Prioul | G01V 1/48 | 703/10 |
| 2010/0309749 A1* | 12/2010 | Yogeswaren | G01V 1/28 | 367/38 |
| 2011/0046934 A1* | 2/2011 | Hatchell | G01V 1/30 | 703/10 |
| 2011/0061860 A1* | 3/2011 | Dean | E21B 43/00 | 166/250.01 |
| 2011/0106507 A1* | 5/2011 | Lepage | G01V 11/00 | 703/2 |
| 2011/0170373 A1* | 7/2011 | Hsu | G01V 1/282 | 367/73 |
| 2012/0029895 A1* | 2/2012 | Xi | G01V 99/005 | 703/10 |
| 2012/0136636 A1* | 5/2012 | Kleine | G01V 99/005 | 703/2 |
| 2013/0151160 A1* | 6/2013 | Chertov | G06F 17/5018 | 702/11 |
| 2013/0206475 A1* | 8/2013 | Prioul | E21B 43/119 | 175/2 |
| 2013/0311158 A1* | 11/2013 | Dasari | G01V 99/005 | 703/10 |
| 2014/0372089 A1* | 12/2014 | Weng | E21B 43/26 | 703/2 |

OTHER PUBLICATIONS

Fjaer et al.("Petroleum related rock mechanics—2nd edition"Elsevier, 2008, pp. 1-491).*

Stavropoulou et al.("Combined Three-Dimensional Geological—Geostatistical—Numerical Model of Underground Excavations in Rock", Rock Mech. Rock Engng. (2007) 40 (3), 213-243 ).*

Deutsch, "Geostatistical Reservoir Modeling, 2002," Oxford University Press, New York.

Duveau, "Assessment of Some Failure Criteria for Strongly Anisotropic Geomaterials," Mechanics of Cohesive-Frictional Materials, 1999, pp. 1-26, vol. 3, Issue 1.

Engelder, "Stress Regimes in the Lithosphere," 1993, Princeton University Press, Princeton.

Fjaer, "Petroleum Related Rock Mechanics," 2008, Elsevier, Amsterdam.

Gardner, "Formation Velocity and Density—The Diagnostic Basics for Stratigraphic Traps," Geophysics, 1974, pp. 770-780, vol. 39, Issue 6, Society of Exploration Geophysicists, Tulsa.

Golub, "Matrix Computations," 1989, Chapter 8, The Johns Hopkins University Press, Baltimore.

Lal, "Shale Stability: drilling fluid interaction and shale strength," SPE 54356, 1999, Society of Petroleum Engineers, Houston.

Lisle, "Stereographic Projection Techniques," 2004, Cambridge University Press, Cambridge.

Tsai, "A General Theory of Strength for Anisotropic Materials," Journal of Composite Materials, 1971, pp. 58-80, vol. 5.

Zoback, "Reservoir Geomechanics," 2007, Cambridge University Press, New York.

* cited by examiner

METHODS AND SYSTEMS FOR CONSTRUCTING AND USING A SUBTERRANEAN GEOMECHANICS MODEL SPANNING LOCAL TO ZONAL SCALE IN COMPLEX GEOLOGICAL ENVIRONMENTS

This application is a continuation-in-part of, and claims the benefit of the filing date of, U.S. patent application Ser. No. 12/616,026, filed on Nov. 10, 2009, which claims the benefit of the filing date of U.S. provisional patent application Ser. No. 61/113,853, filed on Nov. 12, 2008, the disclosure of which is incorporated herein by reference.

BACKGROUND OF THE DISCLOSURE

Field of the Disclosure

Embodiments of the present disclosure generally relate to the fields of geology, geophysics, and geomechanics.

Description of the Related Art

Wellbore operations in intricate geologic environments, such as those in deep water subsalt plays, complicated in-situ stress domains, and tight gas shale, can bring unexpected problems. One way to manage these problems is to develop a very thorough geomechanics model of the subterranean condition and the proposed well trajectory, and to use the model to plan the associated wellbore operations.

Wellbore stability, sand control, and hydraulic fracturing are three challenges that need to be managed. Each challenge requires different considerations for the choice and control of critical operating parameters in order to carry out a trouble-free operation.

Solutions to these challenges, as well as others known in the art, require a reliable subterranean geomechanical model that is constructed from geological and geophysical models in order to estimate and control the range of critical parameters for optimal execution of wellbore operations. The geological model may consist of stratigraphic, sedimentary, diagenetic and structural units in a subterranean model that may include anhydrite, argillaceous, carbonate, salt and siliciclastic formations. To correlate geophysical data in defining the stratigraphic units, biostratigraphy, chemiostratigraphy, chronostratigraphy, lithostratigraphy or sequence stratigraphy can be used.

In complex geologic environments, those correlations are not reliable, and there are no accepted procedures to obtain a geomechanical subterranean model from geological and geophysical models. Most procedures ignore the statistical nature of building a geomechanical model even though geostatistical methods are commonly used in such applications. See, for example, the petrophysical model outlined in *Geostatistical Reservoir Modeling*, by Deutsch C. V., Oxford University press, New York, 2002. Furthermore, established geostatistical techniques for extrapolating scalar quantities such as porosity and permeability are known, but techniques for extrapolation to vector and tensor quantities, such as anisotropic rock property tensors, are lacking. Also, core and plug sample measurements are typically not helpful in constraining parameters since they are sparse or of poor quality. Consequently, many of the conventional procedures can converge to the wrong solutions There is a need, therefore, for a geostatistical method for building a geomechanical model in anisotropic and heterogeneous complex media. There is also a need to apply the geomechanical model to predict the appropriate wellbore operational parameters required to maintain borehole stability in such environments during different operational phases.

SUMMARY

In an exemplary embodiment, of the disclosure, methods and systems for developing subterranean geomechanical models of a complex geological environment are provided. In one embodiment, a method may include estimating a pore pressure field, a stress field, a geomechanics property field, and a geological structure field from a geological concept model. The method may also include geostatistically interpolating vectors and tensors from the estimated fields, and combining the results from the estimated fields and the geostatistically interpolated vectors and tensors to derive a geostatistical geomechanical model of the geological environment.

In an exemplary embodiment, of the disclosure, a system configured to calculate the local overburden gradient, estimate the local pore pressure and fracture gradient, calibrate the local pore pressure to downhole tool pressure measurements, calibrate the local fracture gradient to leak-off tests, estimate the local rock mechanical properties near wells, estimate the local stress regime, estimate the values and directions of the principal stress tensor, and perform a local wellbore stability analysis and iterating until the parameters converge may be provided to ascertain, benchmark, and calibrate the local to zonal geomechanics model.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
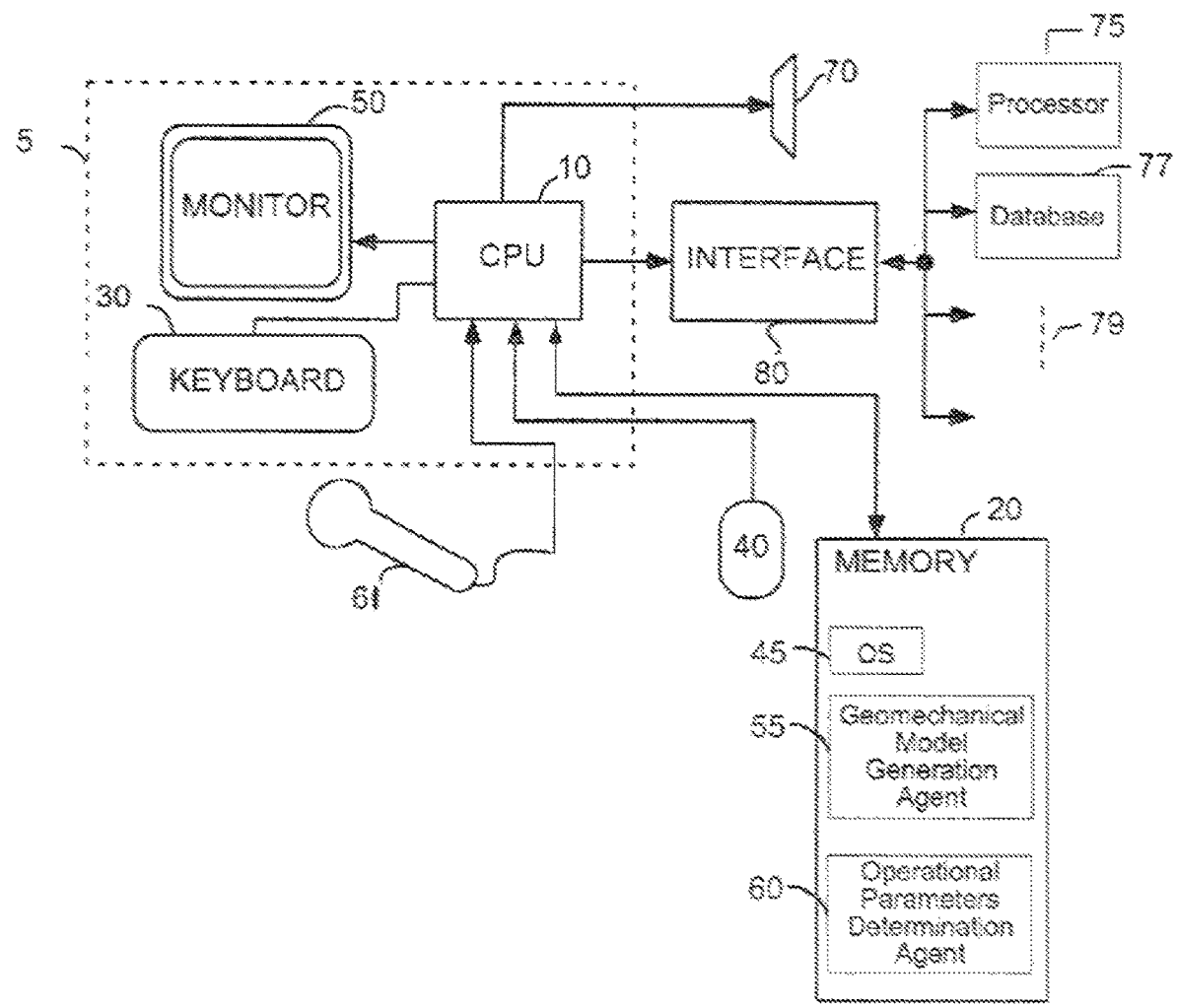
FIG. 1 illustrates an exemplary system for constructing a subterranean geomechanics model in a complex geological environment according to one or more embodiments described.

Applicants note that the following description references exemplary embodiments of the invention. The invention, however, is not limited to any specifically described embodiment; rather, any combination of the following features and elements, whether related to a described embodiment or not, may be used to implement and/or practice the invention. Moreover, in various embodiments, the invention may provide advantages over the prior art; however, although embodiments of the invention may achieve advantages over other possible solutions and the prior art, whether a particular advantage is achieved by a given embodiment is not intended in any way to limit the scope of the invention. Thus, the following aspects, features, embodiments, and advantages are intended to be merely illustrative of the invention and are not considered elements or limitations of the appended claims; except where explicitly recited in a claim. Similarly, references to "the invention" herein should neither be construed as a generalization of any inventive subject matter disclosed herein nor considered an element or limitation of the appended claims; except where explicitly recited in a claim.

Further, at least one embodiment of the invention may be implemented as a program product for use with a computer system or processor. The program product may define functions of the exemplary embodiments (which may include methods) described herein and can be contained on a variety of computer readable media. Illustrative computer readable media include, without limitation, (i) information permanently stored on non-writable storage media (e.g., read-only memory devices within a computer such as CD-ROM disks readable by a CD-ROM drive); (ii) alterable information stored on writable storage media (e.g., computer disks for use with a disk drive or hard-disk drive, writable CD-ROM disks and DVD disks, zip disks, portable memory devices, and any other device configured to store digital data); and (iii) information conveyed across communications media, (e.g., a computer, telephone, wired network, or wireless network). These embodiments may include information shared over the Internet or other computer networks. Such computer readable media, when carrying computer-readable instructions that perform methods of the invention, may represent embodiments of the present invention.

Further still, in general, software routines or modules that implement embodiments of the invention may be part of an operating system or part of a specific application, component, program, module, object, or sequence of instructions, such as an executable script. Such software routines typically include a plurality of instructions capable of being performed using a computer system or other type or processor configured to execute instructions from a computer readable medium. Also, programs typically include or interface with variables, data structures, etc. that reside in a memory or on storage devices as part of their operation. In addition, various programs described herein may be identified based upon the application for which they are implemented. Those skilled in the art will readily recognize, however, that any particular nomenclature or specific application that follows facilitates a description of the invention and does not limit the invention for use solely with a specific application or nomenclature. Furthermore, the functionality of programs described herein may use a combination of discrete modules or components interacting with one another. Those skilled in the art will recognize, however, that different embodiments may combine or merge such components and modules in a variety of ways.

A detailed description will now be provided. Each of the appended claims defines a separate disclosure, which for infringement purposes is recognized as including equivalents to the various elements or limitations specified in the claims. Depending on the context, all references below to the "disclosure" may in some cases refer to certain specific embodiments only. In other cases it will be recognized that references to the "disclosure" will refer to subject matter recited in one or more, but not necessarily all, of the claims. Each of the disclosures will now be described in greater detail below, including specific embodiments, versions and examples, but the disclosures are not limited to these embodiments, versions or examples, which are included to enable a person having ordinary skill in the art to make and use the disclosures, when the information in this patent is combined with available information and technology.

FIG. 1 illustrates an exemplary system for constructing a subterranean geomechanics model in a complex geological environment according to one or more embodiments described. Such system can also be used to predict one or more critical parameters for wellbore stability in such environments. A microprocessor or computer 5 can include a central processing unit (CPU) 10, an input device or keyboard 30, and an output device or monitor 50 on which a software package according to one or more embodiments described herein can be executed. The computer 5 can also include a memory 20, which may include a hard drive or other type of memory commonly associated with a microprocessor or computer. The computer 5 may also include additional/other input and output devices, for example a mouse 40, a microphone 61, and/or a speaker 70. The mouse 40, the microphone 61, and the speaker 70 can be used for, among other purposes, universal access and voice recognition or commanding. The monitor 50 can be touch-sensitive to operate as an input device as well as a display device.

The computer 5 can interface with remote devices, such as a database 77, a support computer or processor 75, other databases, and/or other processors 79, or the Internet via the interface 80. It should be understood that the term "interface" does not indicate a limitation to interfaces that use only Ethernet connections and refers to all possible external interfaces, wired or wireless. It should also be understood that database 77 and/or processor 75 are not limited to interfacing with computer 5 using network interface 80 and can interface with computer 5 in any means sufficient to create a communications path between the computer 5 and database 77 and/or processor 75. For example, in an exemplary embodiment, database 77 can interface with computer 5 via a USB interface while processor 75 can interface via another high-speed data bus without using the network interface 80. In another example, the computer 5, processor 75, and other processors 79 can be configured as part of a multiprocessor distributed system.

It should be understood that even though the computer 5 is shown as a platform on which the methods described can be performed or controlled, the methods described could be performed on any type of computer or microprocessor platform. For example, the many and varied embodiments described herein can be used on any device that has computing or processing capability that allows for the execution of software instructions. For example, the computing capability can include the capability to access any communication bus protocols via the interface 80 such that the user can interact with the many and varied computers 5, processors 75, and/or other databases and processors 79 that can be distributed or otherwise assembled. These devices can include, but are not limited to and are presented for illustrative purposes only: supercomputers, arrayed server networks, arrayed memory networks, arrayed computer networks, distributed server networks, distributed memory networks, distributed computer networks, desktop personal computers (PCs), tablet PCs, hand held PCs, laptops, devices sold under the trademark names BLACKBERRY® or PALM®, cellular phones, hand held music players, or any other device or system having computing capabilities.

Still referring to FIG. 1, programs containing instructions that are executed by a processor can be stored in the memory 20, and the central processing unit 10 is configured to communicate with the memory 20, the input device 30, and the output device 50 to perform tasks for the user based upon the instructions contained in the stored program and various inputs received or inputted into the program. In an exemplary embodiment, the memory 20 includes any number and combination of memory devices, without limitation, as is currently available or can become available in the art. The memory devices can include without limitation, database 77, other databases or processors 79, hard drives, disk drives, random access memory, read only memory, electronically erasable programmable read only memory, flash memory, thumb drive memory, and any other memory device used in conjunction with computers or microprocessors. Those skilled in the art are familiar with the many variations that can be employed using memory devices and no limitations should be imposed on the embodiments herein due to memory device configurations and algorithm prosecution techniques.

The memory 20 can store an operating system program or instructions (OS) 45, a geomechanical model generation agent 55, and an operational parameters determination agent 60. The OS 45 facilitates control and execution of software using the CPU 10. Any available operating system can be used in this manner including WINDOWS®, LINUX®, Apple OS®, UNIX®, and the like. In accordance with exemplary embodiments of the disclosure, the CPU 10 can execute the geomechanical model generation agent 55 when a user requests, among other requests, to construct a subterranean geomechanical model describing the geomechanics of a complex geological environment.

In an exemplary embodiment, the CPU 10 can execute or activate, either from a user request or automatically, the operational parameters determination agent 60 to predict the appropriate wellbore operational parameters required to maintain wellbore stability in the geomechanical modeled environments during different operational phases. It should be noted that the geomechanical model generation agent 55 and the operational parameters determination agent 60 can be fully autonomous code sets or software modules or programs, partially integrated code sets, or fully integrated code sets, and no limitations should be construed from the depiction of the geomechanical model generation agent 55 and the operational parameters determination agent 60 as separate agents. For example, the geomechanical model generation agent 55 can include a software code set configured to control a method configured to construct a subterranean geomechanical model describing geomechanics of a complex geological environment. The geomechanical model generation agent and the operational parameters determination agent can include software code configured to be executed by the local central processing unit to generate the subterranean geomechanical model. It should also be noted that it is not necessary to execute the geomechanical model generation agent 55 and the operational parameters determination agent 60 simultaneously nor is it necessary to execute the two agents on the same computer 5.

Figure 2:
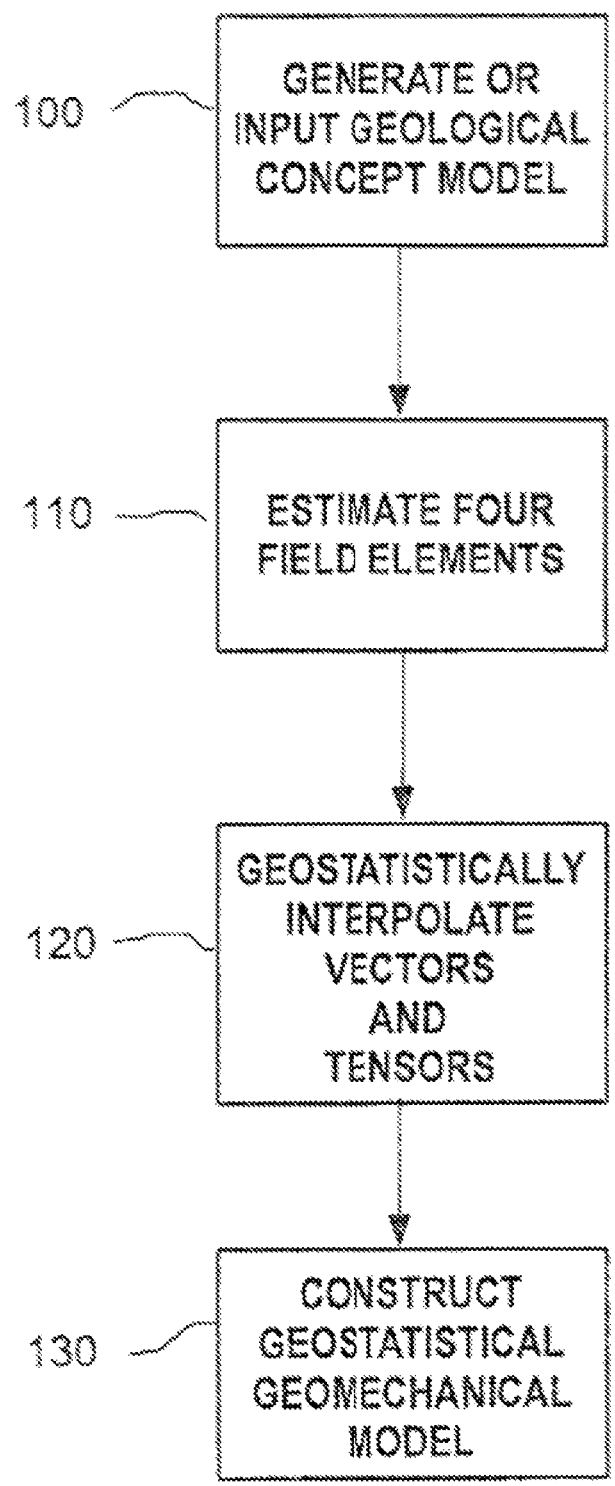
FIG. 2 illustrates an exemplary process flow for developing a subterranean geomechanics model of a complex geological environment according to one or more embodiments.

FIG. 2 illustrates an exemplary process flow for developing a subterranean geomechanical model of a complex geological environment according to an exemplary embodiment of the disclosure. In this embodiment, a geological concept model 100 can be constructed or provided, four field elements can be estimated 110, geostatistical interpolation of scalars, vectors, and tensors 120 can be performed, and a geostatistical geomechanical model 130 can be constructed.

More particularly, the geological concept model 100 can be constructed using known methods or means, in a computer based three dimensional voxel configurations with structural, stratigraphic, facies, and petrophysical properties. This model can include existing and proposed wellbore trajectories as well as seismic and well log data in voxel or feature configurations. Traditionally, these data and wellbore trajectories have been referred to as pixel or object configurations. The geological concept model construction can be integral to the one or more embodiments described herein or the geological concept model 100 can be generated externally and provided as input to one or more of the embodiments described herein.

In an exemplary embodiment, over the domain of interest, the four estimated field elements 110 can be or include a pore pressure field, a stress field, a geomechanical property field, and a geological structure field (thrust planes, salt bodies, etc). As used herein, "pore pressure field" refers to the pressure exerted by fluid in the pore space of sedimentary rocks on grains in the rock volume. The pore pressure field is a scalar field that represents a combination of estimates and measurements of pore fluid pressure at multiple points in units of psi, kPa, MPa, or the like within the subterranean formation volume.

As used herein, "stress field" refers to stress generated when a force is present in the subterranean formation due to gravity, tectonic history, or human-induced events. The stress field is a tensor field representing a combination of estimates and measurements of stress at multiple points in units of kpsi, Mpsi, kPa, MPa, or the like within the subterranean formation volume. The stress field can be an internally distributed force or a force per unit area.

As used herein, "geomechanical property field" refers to one or more metrics of subterranean rock deformability and/or failure. The geomechanical property field can be a scalar or tensor field and represent a combination of estimates and measurements of stress at multiple points within the subterranean formation volume. For example, Young's modulus and Poisson's ratio are measures of rock material elastic deformability while Coulomb's parameters are measures of rock failure.

As used herein, "geological structure field" refers to the geometric characteristics of subterranean rock layers. The geometric characteristics can begin with the overall settings such as continental rifts, deltas, salt, strike-slip, thrust, and inversion tectonic settings and describe the particular hydrocarbon trap styles and geometries within these various settings by lines, planes, and volumes. For example, fault systems can be described by planes and normals to these planes.

Using the microprocessor, the pore pressure field, the stress field, the geomechanical property field, and the geological structure field can be calculated from a geological concept model using historical and/or real-time data. The domain of interest and the geomechanics cube can include the three dimensional region that includes existing and proposed wellbore trajectories within the available seismic velocity cube. The microprocessor can interpolate scalars, vectors, and tensors from the calculated pore pressure field, the stress field, the geomechanics property field, and the geological structure field. A geostatistical geomechanical model 130 can be constructed using the combined results from the calculated pore pressure field, stress field, geomechanical property field, and geological structure field and/or using the geostatistically interpolated scalars, vectors, and tensors of the pore pressure field, stress field, geomechanical property field, and geological structure field. Several known equations and/or uniquely derived equations can be used in the steps described above for performing the analysis.

In an exemplary embodiment of the disclosure, the pore pressure fields can be calculated/estimated by evaluating the hydrostatic gradient in pounds per gallon using a trapezoidal rule, obtaining an estimated compressional interval velocity field in each voxel, fitting an exponential, a hyperbolic, or a polynomial normal compaction trend line through the vertical depth to each of the compressional interval velocity estimates obtained, and iteratively calculating the pore pressure gradient.

In various embodiments of the disclosure, the hydrostatic gradient in pounds per gallon can be described by equation (1):

$$Q_h(z) = \frac{4.16763 * \sum_{i=1}^{N} (\rho_i + \rho_{i-1})(d_i - d_{i-1})}{(d_g + d_w + h)} \quad (1)$$

where z is the depth below Kelly Bushing in feet, $d_g$ is the air-gap in feet, $d_w$ is the water depth in feet, h is the depth below mudline in feet, $\rho_i$, $d_i$ are respectively the fluid density in g/cc and the true vertical depth at the lower end of the trapezoid layer (note: subscript i-1 is for the upper end of the layer), N is the total number of fluid layers. Typical values for the hydrostatic gradient $Q_h(z)$ can be in the range of about 8.00 pounds per gallon to about 9.00 pounds per gallon.

An estimated compressional interval velocity field $v_c$ in each voxel can be calculated from a weighted sum of seismic interval velocity data $v_c^{(s)}$ and existing well log elastic compressional velocity data $v_c^{(w)}$ using 3-D collocated cokriging for each spatially stationary domain. The equation for estimating the compressional interval velocity field can be described by equation (2):

$$\hat{V}_c(r_o) - m_c^{(W)} = \sum_{i=1}^{N} \lambda_i^{(w)} [V_c^{(w)}(r_i) - m_c^{(w)}] + \sum_{j=1}^{M} \lambda_j^{(s)} [V_c^{(s)}(r_j) - m_c^{(s)}] \quad (2)$$

where r is the position vector, $m_c^{(w)}$ is the mean velocity value of well log data, are the $\lambda_i^{(w)}$ kriging weights for the well data, $m_c^{(s)}$ is the mean velocity value of seismic data, $\lambda_j^{(s)}$ are the kriging weights for the seismic data, and N is the number of existing wells and M is the number of seismic samples on the surface or mudline surface (here M=1). One of the expected results of this procedure is the removal of frequency bias.

In an exemplary embodiment, a compaction trend line can be fit through the vertical depth to each of the compressional internal velocity estimates obtained in equation (2) above to estimate $v_n$. An exponential, a hyperbolic, or a polynomial normal compaction trend line can be used as a fit through the vertical depth, and the closest fit normal compaction trend line can be used as the estimate for $v_n$, and $v_n$ can be estimated visually by a human operator and drawn manually on a computer screen. In an exemplary embodiment, the exponential, hyperbolic, and polynomial normal compaction trend line can be described by equations (3), (4), and (5) respectively:

$$\hat{V}_n(h) = V_{max} + (V_{min} - V_{max})\exp(B_1 h) \leftarrow \text{Exponential Fit} \quad (3)$$

$$\hat{V}_n(h) = \frac{(C_1 + C_2 V_{max} - hV_{max})}{(C_2 - h)} \leftarrow \text{Hyperbolic Fit} \quad (4)$$

$$\hat{V}_n(h) = D_1 + D_2 h + D_3 h^2 + D_4 h^3 \leftarrow \text{Polynomial Fit} \quad (5)$$

h is the depth below mudline, $V_{max}$, $V_{min}$ are respectively the maximum and minimum values of the compressional elastic interval velocity in the subterranean medium and $B_1$, $C_1$, $C_2$, $D_1$, $D_2$, $D_3$, $D_4$ are constants obtained from regression analyses such as the least squares method.

In an exemplary embodiment, the estimates generated above can be used along with iteration techniques to calculate the pore pressure gradient. The first approximation and iteration estimates for the pore pressure gradient can be described by equations (6) and (7) respectively:

$$Q_p(z) = Q_o(z) - [Q_o(z) - Q_h(z)]\left[\frac{V_c(h)}{V_n(h)}\right]^k \leftarrow 1^{st} \text{ approx} \quad (6)$$

$$Q_p(z) = Q_o(z)\left[\frac{v_c(h) - V_o}{L_1}\right]^{\frac{1}{L_2}} \leftarrow \text{Iteration estimate} \quad (7)$$

where in equations (6) and (7) z is the depth below a Kelly Bushing associated with drilling operations for the formations of interest, h is the depth below mudline, $Q_p$ is pore pressure gradient in units of pounds per gallon in (6) and units of stress in (7), $Q_o$ is the overburden pressure gradient in units of pounds per gallon in equation (6) and units of stress in equation (7), $Q_h$ is the hydrostatic gradient [given by equation (1)] in pounds pergallon, $v_c$, $v_n$ are respectively obtained from equations (1) and (3 or 4 or 5) and k, $V_o$, $L_1$, $L_2$ are contants obtained from regression analysis for a given geological setting in different regions of the world.

The values for k, Vo, L1, L2 can be, for k in the range of 2 to 4, for Vo in the range of from about 1000 m/s to about 2000 m/s, for L1 in the range of from about 25 to about 35, and for L2 in the range of from about 0.3 to about 1.4. In an exemplary embodiment, the overburden pressure gradient can be described by equation (9) shown below. Calculations/estimations for stress field and principal stress directions can be acquired or obtained by estimating the density field in each voxel, evaluating the vertical overburden gradient, evaluating the fracture gradient, determining a first order approximation to a principal in-situ stress state at true vertical depth, obtaining a better estimate of the larger horizontal principal stress using known methods, determining the direction so of the maximum and minimum (quasi-) horizontal stress using known methods, and constructing the total stress tensor where the total stress tensor minus the pore pressure can define an effective stress tensor. The stress tensor can be propagated, using one or more of the embodiments described below through the domain of interest to obtain a realization of a stress field.

In an exemplary embodiment, density logs associated with existing well locations can be available or can be constructed from elastic velocity well logs and seismic data from Gardner type relationships. For example, Gardner type relationships can be constructed using one or more methods described in the article: Formation velocity and density— The diagnostic basis for stratigraphic traps, Gardner, G. H. F., Gardner, L. W., and Gregory, A. R., *Geophysics*, 39, pp 770-780, 1974, the entirety of which is incorporated by reference herein to the extent this publication is not inconsistent with the present disclosure.

Obtaining an estimated scalar density field $\rho$ in each voxel can be achieved from a weighted sum of seismic velocity derived density data $\rho^{(s)}$ and the well log density data $\rho^{(w)}$ using 3-D collocated cokriging for each spatially stationary domain. In an exemplary embodiment, the estimated density field can be described by equation (8):

$$\hat{\rho}(r_0) - m_d^{(w)} = \sum_{i=1}^{N} \eta_i^{(w)} [\rho^{(w)}(r_i) - m_d^{(w)}] + \sum_{j=1}^{M} \eta_j^{(s)} [\rho^{(s)}(r_j) - m_d^{(s)}] \quad (8)$$

where r is the position vector, $m_d^{(w)}$ is the mean density value of well log data, are the $\eta_i^{(w)}$ kriging weights for the well data, $m_d^{(s)}$ is the mean density value of seismic data, $\eta_j^{(s)}$ are the kriging weights for the seismic data, and N is the number of existing wells and M is the number of seismic samples on the surface or mudline surface. In an exemplary embodiment, M can equal 1. A procedure similar to the one used above for estimating the scalar density field $\rho$ can be used to estimate porosity $\hat{\phi}$ and $v_{clay}$ throughout the subterranean zone of interest.

Evaluating the vertical overburden gradient in pounds per gallon can be accomplished by using a trapezoidal rule. In an exemplary embodiment, the evaluation can be described by equation (9):

$$Q_o(z) = \frac{4.167638 \left[ 2 d_w \rho_w + \sum_{i=1}^{N} (\hat{\rho}_i + \hat{\rho}_{i-1})(d_i - d_{i-1}) \right]}{(d_g + d_w + h)} \quad (9)$$

where z is the depth below Kelly Bushing in feet, $d_g$ is the air-gap in feet, $d_w$ is the water depth in feet, h is the depth below mudline in feet; $\rho_w$ is the seawater density in g/cc, for example the seawater density can be equal to about 1.03 g/cc; $\hat{\rho}_i$ and $d_i$ are respectively the formation density estimate in g/cc and the true vertical depth in ft. For example, the formation density can be equal to about 2.31 g/cc and the true vertical depth at the lower end of the trapezoid layer can be equal to about 15,000 ft. It should be noted that the subscript −1 is for the upper end of the layer. In an exemplary embodiment, N is the total number of formation (lith) layers. In an exemplary embodiment, the overburden gradient $Q_o(z)$ can be calculated to be in the range of from about 18.00 pounds per gallon to about 20.00 pounds per gallon.

In an exemplary embodiment, evaluating the fracture gradient can be described by equation (10):

$$Q_f(z) = Q_p(z) + K_2[Q_o(z) - Q_p(z)] \quad (10)$$

where z is the depth below Kelly Bushing in feet, $Q_p$ pore pressure gradient derived from equation (7), $Q_o$ is the overburden gradient derived from equation (9) above and $K_2$ is a constant. In an exemplary embodiment, the constant $K_2$ is equal to about 0.8 for shale and about 0.5 for sandstone. In an exemplary embodiment, the fracture gradient can be calibrated against at-site leak-off tests (LOTS).

In an exemplary embodiment, determining a first order approximation to a principal in-situ stress state at true vertical depth z can be described by equations (11), (12), and (13) for vertical principal stress in pounds per square inch, smaller horizontal principal stress in pounds per square inch, and larger horizontal principal stress in pounds per square inch, respectively:

$$S_V(z) = \frac{z Q_o(z)}{19.25} \quad (11)$$

$$S_h(z) = \frac{z Q_f(z)}{19.25} \quad (12)$$

$$S_H(z) = \frac{S_V(z) + S_h(z)}{2} \quad (13)$$

This first order stress state can serve as a fair approximation in normally stressed regions, for example those found in the Gulf of Mexico and Central North Sea. In an exemplary embodiment, a better estimate of $s_H$ can be calculated using actual wellbore breakout information with equation (6-19) found in the reference *Stress Regimes in the Lithosphere*, Engelder T., Princeton University Press, Princeton, N.J., 1993, the entirety of which is incorporated by reference herein, to the extent this publication is consistent with the present disclosure. The frictional faulting equations (4.45), (4.46) and (4.47) found in the reference *Reservoir Geomechanics*, Zoback M., Cambridge University Press, New York, 2007, can be used to constrain $s_v$, $S_H$, and $s_h$.

The in-situ principal stress state in normally stressed regions such as those found in the Gulf of Mexico and the North Sea are mostly aligned with vertical and horizontal axes. However, in more complex strike-slip fault regions, for example in Southeast Asia in the Timor Sea and the South China Sea, and in thrust fault regions, for example in the foothills of the Rockies in North America and the Andes in South America, the principal stress directions may no longer be aligned with vertical and horizontal directions. In an exemplary embodiment, the directions of the maximum and minimum (quasi-) horizontal stresses can be determined from regional tectonics, fault patterns, borehole breakouts, and borehole fractures as discussed in the reference *Stress Regimes in the Lithosphere*, Engelder T., Princeton University Press, Princeton, N.J., 1993, the entirety of which is hereby incorporated by reference, to the extent this publication is consistent with the present disclosure.

In various embodiments of the disclosure, the total stress tensor $S_{ij}$ can be constructed along each wellbore trajectory using the results from estimating the density field in each voxel, evaluating the vertical overburden gradient, evaluating the fracture gradient, determining a first order approximation to a principal in-situ stress state at true vertical depth, obtaining a better estimate of the larger horizontal principal stress using known methods, and determining the direction of the maximum and minimum (quasi-) horizontal stress. In an exemplary embodiment, the total stress tensor $S_{ij}$ minus the pore pressure p can define an effective stress tensor $s_{ij}$ with pore pressure in units of pounds per square inch (psi). In an exemplary embodiment, the pore pressure p can be described by equation (14):

$$p(z) = \frac{zQ_p(z)}{19.25} \quad (14)$$

The total stress tensor $S_{ij}(r)$ can have off-diagonal elements that can be estimated by elasticity solutions or by building a finite element model. In general, the total stress tensor $S_{ij}$ is only known with some certainty along the trajectories of a limited number of wells. This stress tensor can be propagated in the domain of interest to obtain a realization of a stress field using the one or more embodiments described below for geostatistical interpolation of Tensors. Eigen values and Eigenvectors of the propagated stress tensor can give the values of principal stresses and their corresponding directions at each point (voxel) in the field.

In an exemplary embodiment, estimation of the geomechanics property field for the region of interest can be generated. The shear velocity $v_s$ can be determined. For isotropic formations, Static Young's modulus (E) and Static Poisson's ratio (v), unconfined compressive strength (UCS) for the formation, the friction angle $\theta$, and estimates of cohesive strength (cs) and tensile strength (TS) of the formation can be obtained. For anisotropic formations, the elastic stiffness tensor and the first order, second order, fourth order, and/or sixth order strength tensor(s) can be estimated using known methods. The tensors can be propagated using one or more embodiments for geostatistical interpolation of tensors, described herein.

In an exemplary embodiment, the shear velocity $v_s$ for each voxel can be estimated using equations (15) and (16) shown below. Where well log and seismic shear velocities are available, the shear velocity can be calculated using equation (15).

$$\hat{V}_s(r_0) - m_s^{(w)} = \sum_{i=1}^{N} \mu_i^{(w)}[V_s^{(w)}(r_i) - m_s^{(w)}] + \sum_{j=1}^{M} \mu_j^{(s)}[V_s^{(s)}(r_j) - m_s^{(s)}] \quad (15)$$

where r is the position vector, $m_s^{(w)}$ is the mean shear velocity value of well log data, are the $\mu_i^{(w)}$ kriging weights for the well data, $m_s^{(s)}$ is the mean shear velocity value of seismic data, $\mu_j^{(s)}$ are the kriging weights for the seismic data, and N is the number of existing wells and M is the number of seismic samples on the surface or mudline surface. In an exemplary embodiment, M can equal 1.

In an exemplary embodiment, sufficient information may not be available to use equation (15), and therefore the shear velocities can be estimated using a transform described by equation (16):

$$\hat{V}_s = A_1(\rho)^{m_1} + A_2(\phi)^{m_2} + A_3(V_{clay})^{m_3} + A_4(V_c)^{m_4} \quad (16)$$

where velocities are in km/s, $\rho$ is specific gravity, $\phi$ is porosity as a fraction, $V_{clay}$ is clay volume as a fraction, $V_c$ is compressional velocity, and $A_1$ to $A_4$ & $m_1$ to $m_4$ are constants. For example, in one particular example, the values for $A_1$ to $A_4$ and $m_1$ to $m_4$ have been calculated as: $A_1 = -0.97034$; $A_2 = 0.67735$; $A_3 = -0.16971$; $A_4 = 0.80942$; $m_1 = 0$; $m_2 = 1$; $m_3 = 0.5$; $m_4 = 1$.

Four isotropic formations, the first and the second elastic parameters, namely, Static Young's modulus (E) and Static Poisson's ration (v) can be estimated using the equations (19a,b):

$$E = G_1\left[\frac{\hat{\rho}V_s^2(3V_c^2 - 4V_s^2)}{(V_c^2 - V_s^2)}\right]^{r_1}; \hat{v} = H_1\left[\frac{(V_c^2 - 2V_s^2)}{2(V_c^2 - V_s^2)}\right]^{r_2} \quad (19a, b)$$

where $\hat{\rho}$ is the density estimate in $kg/m_3$, $v_c$ & $v_s$ are respectively the compressional and shear elastic velocity estimates in m/s from equations (2) & (16) above respectively. $G_1$, $H_1$, $r_1$, $r_2$ are constants determined from a regressional analysis of worldwide data in formations including anhydrite, argillaceous, carbonate, salt, and siliciclastic types.

For isotropic formations, the first strength parameter, namely, unconfined compressive strength (UCS) for the formation can be estimated by equation (20):

$$UCS = U_1 \Delta t(E)^{m_1}(\hat{\phi})^{m_2}(V_{clay})^{m_3}(V_c)^{m_4} \quad (20)$$

or $$UCS = W_1 \Delta t \exp(n_1 E)\exp(n_2 \hat{\phi})\exp(n_3 V_{clay})\exp(n_4 V_c) \quad (21)$$

where UCS is in units of MPa, E is the static Youngs Modulus in GPa, $\hat{\phi}$ is porosity as a fraction, $V_{clay}$ is clay volume as a fraction, $\Delta t_c (= unit conv. Const*/V_c)$ is compressional acoustic slowness in microseconds per foot and $U_1$, $W_1$, $m_1$ to $m_4$ & $n_1$ to $n_4$ are constants determined from a regression analysis of worldwide data.

For isotropic formations, the second strength parameter, namely, the friction angle can be estimated as a function F of compressional velocity $V_c$, porosity $\phi$ and $V_{clay}$ described in equation (22):

$$\hat{\theta} = \mathscr{F}(V_c, \hat{\phi}, V_{clay}) \quad (22)$$

For example, one simple form of the function F is given by $\mathscr{F}$ ($\theta = \sin^{-1}(Vc-1000)/Vc+1000))$ as provided in the reference, *Shale Stability: drilling fluid interaction and shale strength*, Lal M., SPE 54356, Society of Petroleum Engineers, Houston, 1999, the entirety of which is hereby incorporated by reference, to the extent that this publication is consistent with the present disclosure.

Similarly, for isotropic formations, estimates of cohesive strength (CS) and tensile strength (TS) of the formation can be obtained by functional relationships of the form given by equations (23a,b):

$$CS = \mathscr{H}(UCS, \hat{\theta}, \hat{\phi}, V_{clay}); TS = \mathscr{J}(UCS, \hat{\theta}, \hat{\phi}, V_{clay}) \quad (23a,b)$$

For example, one simple form of the functions $\mathscr{H}$ (CS=UCS(1+sin $\theta$/2 cos $\theta$) and $\mathscr{J}$ (TS=UCS/12) are provided in the reference, *Petroleum Related Rock Mechanics*, Fjaer E., et al, Elsevier, Amsterdam, 2008, the entirety of which is hereby incorporated by reference, to the extent that this publication is consistent with the present disclosure.

For anisotropic formations, the elastic stiffness tensor can be Vertically Transversely Isotropic (VTI), Horizontally Transversely Isotropic (HTI), Orthotropic, Monoclinic or have lesser symmetry. Similar considerations can apply to the Poisson's ratio tensor. These property tensors are typically only known with any certainty close to existing well locations. The tensors can be propagated throughout the subterranean zone of interest. In an exemplary embodiment, the tensors can be decomposed into components, the components can be propagated to the new location, and the tensor can be formed at the new location by combing the components.

For anisotropic formations, first order, second order, fourth order, or sixth order strength tensor(s) can be estimated as detailed in the references: A General Theory of Strength for Anisotropic Materials, Tsai S. W. and Wu E. M.,

*Journal of Composite Materials*, Vol. 5, pp 58-80, 1971; and Assessment of Some Failure Criteria for Strongly Anisotropic Geomaterials, Duveau G. et al., *Mechanics of Cohesive-Frictional Materials*, Vol. 3, pp 1-26, 1998, the entirety of which (both publications) are hereby incorporated by reference, to the extent that these publications are consistent with the present disclosure. These property tensors are typically only known with any certainty close to existing well locations. The tensors can be propagated throughout the subterranean zone of interest. In an exemplary embodiment, the tensors can be decomposed into components, the components can be propagated to the new location, and the tensor can be formed at the new location by combing the components.

In an exemplary embodiment, estimation of the geological structural field can be performed. Subterranean geological structures and parameters which influence the geomechanical response due to wellbore operations can be estimated and defined by vectors as detailed in the reference *Streographic Projection Techniques*, by Lisle R. J., and Leyshon P. R., Cambridge University Press, 2004, the entirety of which is hereby incorporated by reference, to the extent that this publication is consistent with the present disclosure. These random vector fields, when amenable to the stationary hypothesis, can be propagated throughout the zone of interest using geostatistical interpolation of vectors, one or more embodiments of which are described below.

In an exemplary embodiment, geostatistical interpolation of vectors can be performed. Vector variables such as fracture orientations or Eigenvectors of geomechanics tensors can be a subset of a larger set of randomly distributed geological quantities. These random vector variables are typically only known with any confidence at well locations of the subterranean zone of interest. In an exemplary embodiment, to propagate these variables away from known locations to unknown locations, the geostatistical equations (24), (25), and (26), as described below, can be used.

$$X_i(r_0) - m_x^{(w)} = \sum_{j=1}^{N} \xi_{ij}^{(w)} [X_i^{(w)}(r_j) - m_x^{(w)}] + \sum_{k=1}^{M} \xi_{ij}^{(s)} [X_i^{(s)}(r_k) - m_x^{(s)}] \quad (24)$$

where r is the position vector, $\hat{X}_i$ is the i-th component of estimated vector, $m_x^{(w)}$ is the mean value of i-th component of vector at well location, are the $\xi_{ij}^{(w)}$ kriging weights for the well location value, $m_x^{(s)}$ is the mean value of the i-th component of vector at seismic location, $\xi_{ij}^{(s)}$ are the kriging weights for the seismic location value, N is the number of existing wells, and M is the number of seismic samples on the surface or mudline surface. The kriging weights $\xi_{ij}$ can be determined from equation (25):

$$\begin{bmatrix} 0 & \gamma(X(r_1)-X(r_2)) & . & \gamma(X(r_1)-X(r_N)) & 1 \\ \gamma(X(r_1)-X(r_2)) & 0 & . & \gamma(X(2)-X(r_N)) & 1 \\ . & . & . & . & . \\ \gamma(X(r_1)-X(r_N)) & \gamma(X(r_2)-X(r_N)) & . & 0 & 1 \\ 1 & 1 & . & 1 & 0 \end{bmatrix} \quad (25)$$

-continued $$\begin{bmatrix} \xi_{1j} \\ \xi_{2j} \\ . \\ \xi_{Nj} \\ \delta \end{bmatrix} = \begin{bmatrix} \gamma(X(r_j)-X(r_1)) \\ \gamma(X(r_j)-X(r_2)) \\ . \\ \gamma(X(r_j)-X(r_N)) \\ 1 \end{bmatrix}$$

where the vector varigram function $\gamma(h)$ can be defined by:

$$\gamma(h) = \frac{1}{2N(h)} \sum |X(r) - X(r+h)|^2 \quad (26)$$

In an exemplary embodiment, geostatistical interpolation of tensors can be performed. In general, tensors, for example the formation elasticity tensor $C_{ij}$ or the formation total stress tensor $S_{ij}$, are typically only known with some certainty along the trajectories of a limited number of wells. In order to propagate these tensors throughout the subterranean zone of interest (the geomechanics cube), the tensors can be decomposed into components, the components can be propagated to the new location, and the tensor can be formed at the new location by combing the components. For example, in an exemplary embodiment, a Schur decomposition of the real valued symmetric tensor $T_{ij}$ can be carried out to obtain components in the form of a diagonal Eigen value matrix and a rotation matrix. The diagonal Eigen value matrix can be geostatistically propagated. The rotational matrix can be interpolated by using Quaternion interpolation if the wells are relatively close to one another. The rotational matrix can be interpolated by using geostatistical propagation if the wells are relatively far apart. In an exemplary embodiment, the tensor can be reconstituted from the propagated Eigenvalue matrix and the rotational matrix. In an exemplary embodiment, the equations for geostatistical interpolation can be described by equations (27) through (30) shown below.

The second order tensor can be subjected to a decomposition using, for example, the method outlined in the reference *Matrix Computations*, Golub G. H. and Van Loan C. F., Chapter 8, The Johns Hopkins University Press, Baltimore, Md., 1989, the entirety of which is hereby incorporated by reference into the present disclosure, to the extent that this publication is consistent with the present disclosure. The decomposition can be described by equation (27) as:

$$[Q(r)]^T[T(r)][Q(r)] = \text{diag}(\lambda_1(r) \ldots \lambda_n(r)) = [\Lambda(r)] \quad (27)$$

where [Q] is a rotation matrix, $\lambda_t \ldots \lambda_n$ are the resulting Eigenvalues and r is the position vector.

In an exemplary embodiment, the matrices [Q(r)], [Λ(r)] can be written as a concatenation of basis vectors as:

$$[Q(r)] = [q_1(r) \ldots q_n(r)]; [\Lambda(r)] = [e_1(r) \ldots e_n(r)] \quad (28a, b)$$

Each of the vector in equation 28(a,b) $q_n(r)$, $e_n(r)$ can be propagated in the zone of interest, using steps detailed above for geostatistical interpolation of vectors, to the required location at $r_0$ and reconstituted to form, in an exemplary embodiment, the matrices described by equations (29a,b):

$$[Q(r_0)] = [\hat{q}_1(r_0) \ldots \hat{q}_n(r_0)]; [\Lambda(r_0)] = [\hat{e}_1(r_0) \ldots \hat{e}_n(r_0)] \quad (29a,b)$$

In an exemplary embodiment, the propagated tensor can be obtained by using estimated solutions to [Q($r_0$)], [Λ($r_0$)] from equation (29a,b). The propagated tensor can be described by equation (30):

$$[T(r_0)] = [Q(r_0)][\Lambda(r_0)][Q(r_0)]^T \quad (30)$$

From the analyses described above, with reference to the one or more embodiments of equations (1) through (30), the geostatistical geomechanical model 130 can be constructed. The one or more equations can be solved by standard methods on single processor and/or multiprocessor systems. In an exemplary embodiment, solving equations (1) through (30) can be achieved using one or more embodiments of the computer 5 described in FIG. 1 above. In an exemplary embodiment, the pore pressure field, stress field, geomechanics property field, geological structures, and other calculations from above can be used in a finite element model to perform a wellbore stability analysis.

Figure 3:
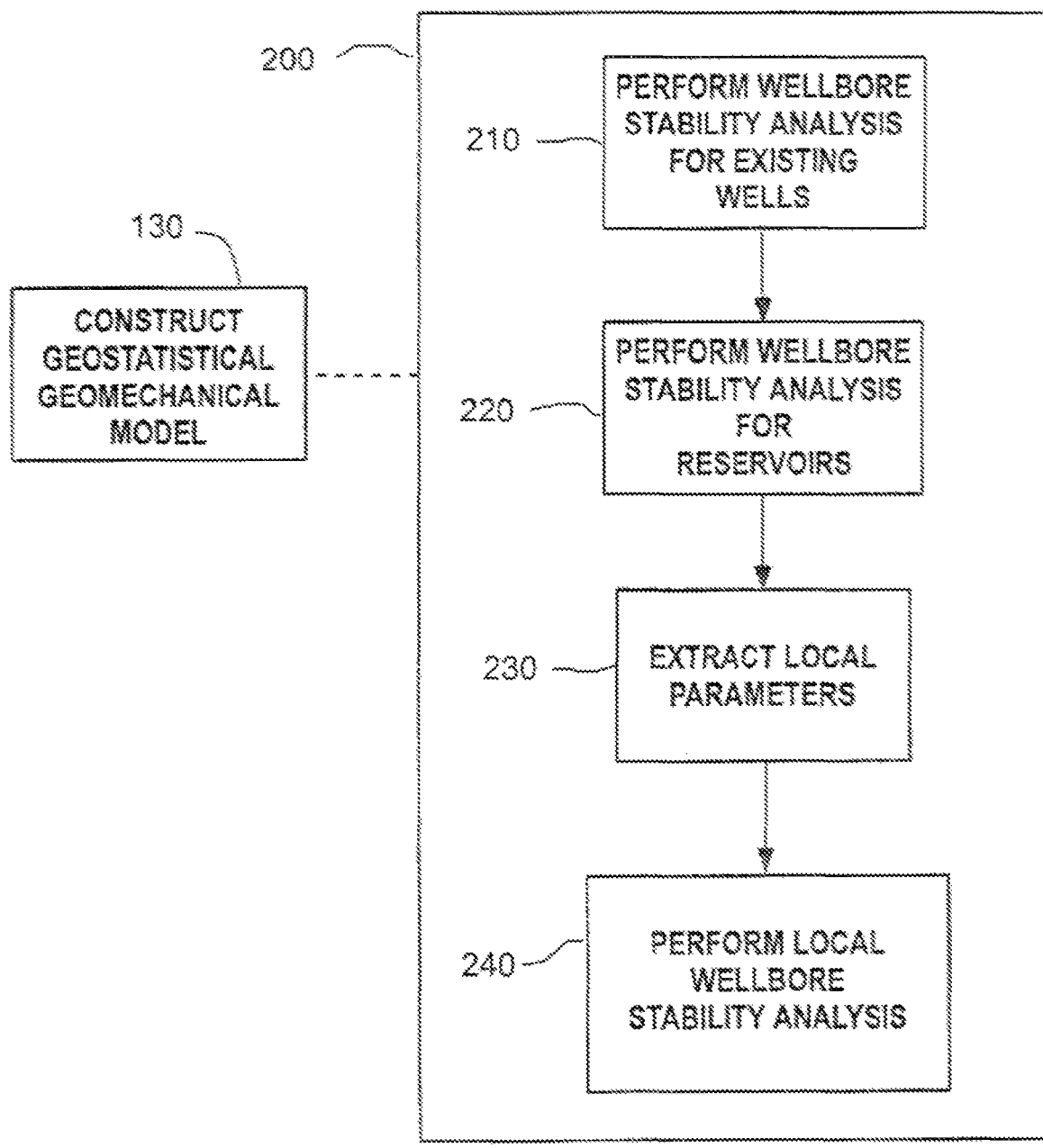
FIG. 3 illustrates an exemplary process flow for a wellbore stability analysis system in a formation that is used to construct and calibrate a geostatistical geomechanical model, according or more embodiments.

FIG. 3 illustrates an exemplary process flow for a wellbore stability analysis system in a formation that is used to construct and calibrate a geostatistical geomechanical model, according or more embodiments. In this embodiment, the wellbore stability analysis system 200 can be used for analysis of existing wells 210 to ascertain, benchmark, and calibrate the local to zonal geostatistical geomechanical model. The geomechanical model thus constructed can be used for future planned wells targeting reservoirs 220, for well drilling preparations 230, and/or for performing a local wellbore stability analysis 240 for proposed wellbore trajectories. The calibrated geostatistical geomechanical model can be displayed on a computer screen or printed for a user. In an exemplary embodiment, any model, for example a layer-cake model, can be used as inputs to a wellbore stability analysis system 200. The geostatistical geomechanical model 130 can be used as inputs to the wellbore stability analysis system 200. In an exemplary embodiment, simulation methods such as the Sequential Gaussian method can also be applied.

In an exemplary embodiment of this disclosure, the wellbore stability analysis system for existing wells 210 can be used. The analysis can include collecting well file data for existing drilled wells using daily drilling reports, daily mud reports, and other relevant historical and/or real-time data and creating well trouble plots. The analysis can also include collecting available geophysical, well log, drilling, production, and well test data. For example, seismic data, well logs, and well tests, such as leak-off tests and measured core and/or test plug properties can be collected. Poor quality data can be filtered out, and the collected data can be used to define initial conditions and/or for calibration data, among other things.

The analysis may further include calculating the local overburden gradient from well density logs and/or estimating the local pore pressure and fracture gradient using, for example well sonic (acoustic) and/or resistivity logs. The analysis may further include calibrating the local pore pressure to downhole tool pressure measurements and the fracture gradient to leak-off test measurements (if available) and/or estimating the local rock mechanical properties near wells from well log data and calibrating to any core and/or plug measurements that may be available. The analysis can include estimating the local stress regime as well as values and directions of principal stress tensor, for example $S_v$, $S_H$ and $S_h$, including tensor rotations, from borehole image logs. Finally, the analysis can include performing the local wellbore stability analysis 240 for proposed wellbore trajectories, in accordance with one or more embodiments described herein, and iterating until the parameters converge.

In an exemplary embodiment, the wellbore stability analysis system for reservoirs 220 can be performed using the analyses associated with the wellbore stability analysis system for existing wells 210 described above and propagating the local estimated parameters. The propagation can be performed by methods including collocated cokriging, kriging, or Monte Carlo techniques with known formation data such as seismic through the reservoir to obtain realizations of global values of parameters.

In an exemplary embodiment, the wellbore stability analysis system for well drilling preparations 230 can be performed by extracting the local parameters, for example determining local pore pressure, fracture gradient, overburden gradient, rock mechanical properties and in-situ stresses, along proposed wellbore trajectories from the global model generated during the wellbore stability analysis for reservoirs 220 and performing the local wellbore stability analysis 240 for proposed wellbore trajectories. In an exemplary embodiment, the local wellbore stability analysis 240 for proposed wellbore trajectories can be performed.

In an exemplary embodiment, the local wellbore stability analysis 240 for pre-drill estimation can be performed. In an exemplary embodiment, the local wellbore stability analysis 240 for real-time monitoring can be performed. In an exemplary embodiment, the local wellbore stability analysis 240 for post-drill analysis can be performed. It should be understood that, in an exemplary embodiment, multiple realizations can be made to evaluate probability density functions (pdf) and cumulative distribution functions (cdf) for operational control parameters such as mud weights.

Figure 4:
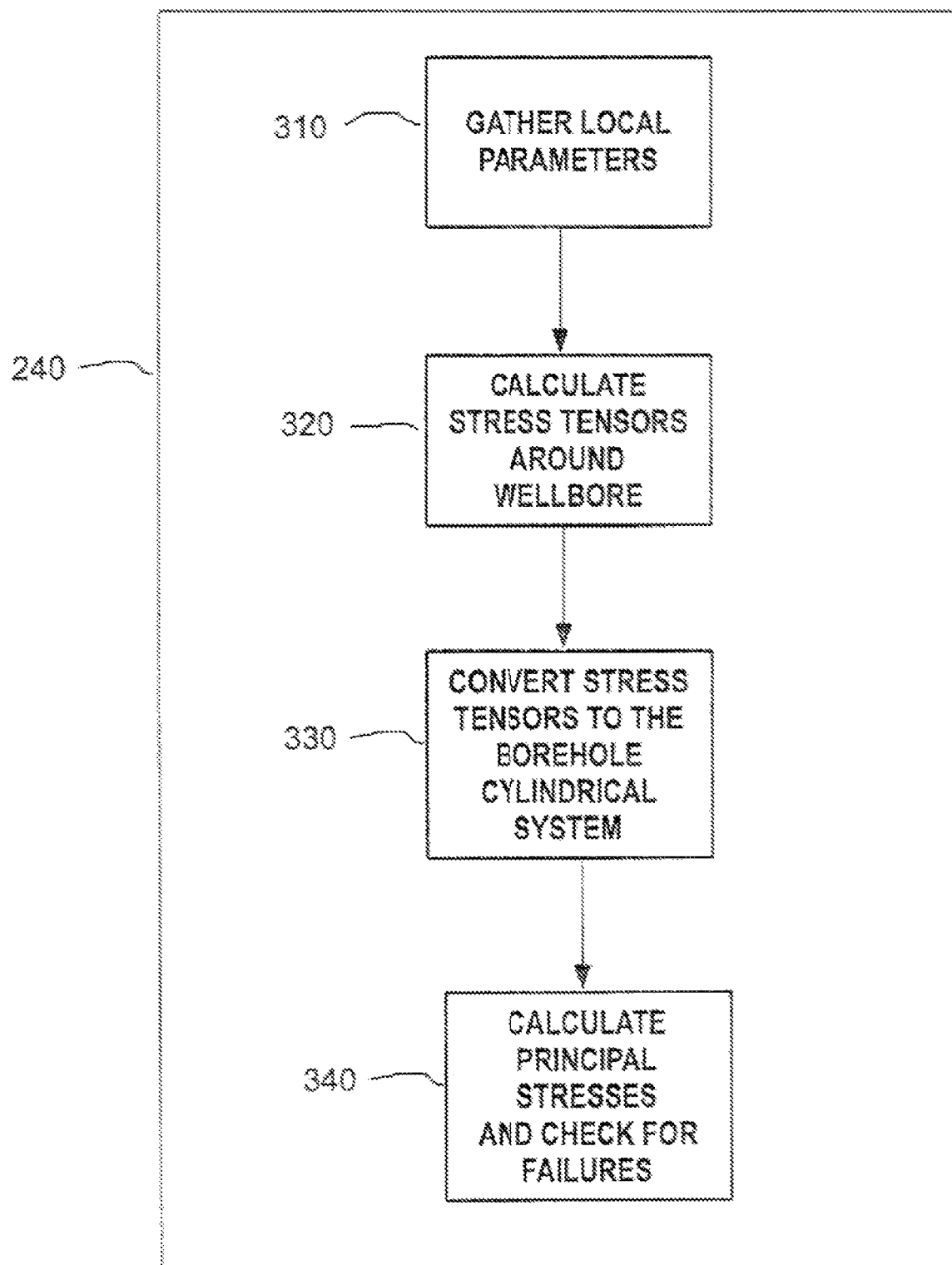
FIG. 4 illustrates an exemplary process flow for performing the local wellbore stability analysis for wellbore trajectories according to one or more embodiments.

FIG. 4 illustrates an exemplary process flow for performing the local wellbore stability analysis for wellbore trajectories according to one or more embodiments. In an exemplary embodiment, performing the local wellbore stability analysis 240 for proposed wellbore trajectories can include gathering local parameters 310, calculating stress tensors around the wellbore 320; converting the stress tensors to the borehole cylindrical system 330, calculating the principal stresses and checking for failures 340. In an exemplary embodiment, gathering local parameters 310 can include for example Pore Pressure gradient, Principal Stresses gradient: (SHg, Shg, Svg), Rock Properties: (c, $\phi$, E, $\upsilon$), Borehole trajectory, Azimuth, Inclination Angle, and Mud Density, there entirety of which is hereby incorporated by reference to the extent that this publication is consistent with the present disclosure. In an exemplary embodiment, several known equations and/or uniquely derived equations can be used for performing wellbore stability analysis and one or more of the applicable equations can be presented as equations (31) to (45) below.

In an exemplary embodiment, one or more calculations can be associated with the wellbore stability analysis system 200. Exemplary equations for the calculations can be described by a set of equations which can include equations (31) through (41).

In general, the stress at a borehole wall at either the yield or the rupture point cannot be measured directly. However, it can be estimated. Prediction of failure conditions can be accomplished by comparing a function of the stresses at the borehole wall, calculated using a material model such as linear elasticity theory, with the strength of the rocks inferred from geophysical measurements in the field or in laboratory tests. In an exemplary embodiment, formation strength and failure models can include Mohr-Coulomb, Drucker-Prager, Modified Lade, Hoek-Brown and other published models. In an exemplary embodiment, unknown properties of the rock can be a function of other known properties of the rock such as unconfined compressive strength (UCS).

In an exemplary embodiment, the exemplary equations can be used to calculate stress and shear components. In an exemplary embodiment, a coordinate system change can be performed. For example, the in-situ stress state can be divided into three stress components, overburden or vertical stress $S_v$ and two horizontal stresses $S_H$, and $S_h$. This coordinate system can be rotated to the well axis and the stress response can be calculated.

Figure 5:
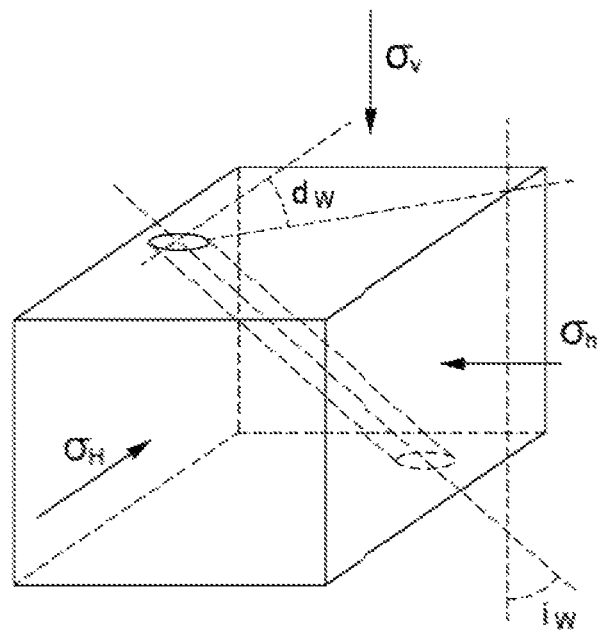
FIG. 5 illustrates an exemplary wellbore coordinate system and in-situ stresses divided into three stress states according to one or more embodiments.
Figure 6:
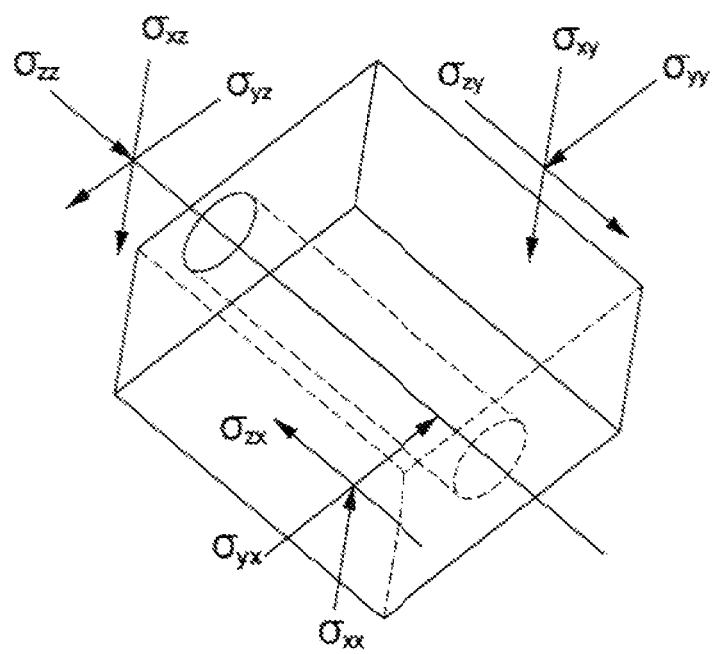
FIG. 6 illustrates an exemplary wellbore coordinate system and in-situ stresses rotated into a wellbore coordinate system according to one or more embodiments.

FIG. 5 illustrates an exemplary wellbore coordinate system and in-situ stresses divided into three stress states according to one or more embodiments. FIG. 6 illustrates an exemplary wellbore coordinate system and in-situ stresses rotated into a wellbore coordinate system according to one or more embodiments. The rotated in-situ stress system can be represented by: $\sigma^R_{xz}$—the normal stress component in the x-direction, $\sigma^R_{yy}$—the normal stress component in the y-direction, $\sigma_{zz}^R$—the normal stress component in the z-direction and, $\tau^R_{yz}$, $\tau^R_{xz}$, $\tau^R_{xy}$ the corresponding shear stress components in the xyz coordinate system with reference to FIG. 5 and FIG. 6.

Referring to FIG. 5, the principal in-situ stresses, the minimum horizontal stress $S_h$, the maximum horizontal stress $S_H$, and the overburden stress $S_v$, can be aligned with the coordinate (h, H, v). The axis of the deviated well can be defined by the well inclination angle and the well direction azimuth. The well inclination can be measured relative to the vertical axis (overburden stress axis) and the direction to the maximum horizontal stress axis $S_H$. The rectangular (xyz) and cylindrical (rθz) coordinate systems can be used to describe the stresses around the wellbore when the wellbore axis is aligned with the z-axis. The angle $i_w$ can be measured counterclockwise from the x-axis and this axis can be pointed in the direction of the higher side of the wellbore.

In an exemplary embodiment, for the generalized plane case, the stress and shear stress in the cylindrical (rθz) coordinate system can be represented by, $\sigma_{rr}$, $\sigma_{\theta\theta}$, $\sigma_{zz}$, $\tau_{\theta z}$, $\tau_{rz}$, $\tau_{r\theta}$. These stress components are defined as $\tau_{rr}$—radial stress, $\sigma_{\theta\theta}$—azimuthal or angular stress, $\sigma_{zz}$—axial stress, $\tau_{\theta z}$—shear stress on the azimuthal plane in the axial direction, $\tau_{rz}$—shear stress on the radial plane in the axial direction, and, $\tau_{r\theta}$—shear stress on the radial plane in the azimuthal direction. In an exemplary embodiment, the stresses in the cylindrical (rθz) coordinate system can be derived as very lengthy expressions. Due to the complex nature of the expressions, only angular stress $\sigma_{\theta\theta}$ is given below and is represented by equations (31) through (41) below:

$$\sigma_{\theta\theta} = \frac{S_H \delta}{\Delta}\Gamma(A, B, C, D, E, n, \beta) + \frac{S_h \delta}{\Delta}\Gamma(A, B, C, D, E, n, (90+\beta)) - p_w \quad (31)$$

where $$\delta^2 = n^2\sin^2\theta + \cos^2\theta; n = A/B \quad (32a, b)$$

$$\Delta = C_{11}\begin{bmatrix} D_{11}n^4\sin^4\theta - 2D_{16}n^3\sin^3\theta\cos\theta + \\ (2D_{12} + D_{66})n^2\sin^2\theta\cos^2\theta - \\ 2D_{26}n\sin\theta\cos^3\theta + D_{22}\cos^4\theta \end{bmatrix} \quad (33)$$

$$\Gamma = \quad (34)$$

$$\left\{ \begin{array}{l} [nD\sin^2\beta + (A+nC)\sin\beta\cos\beta + (\beta+nE)\cos^2\beta]n\sin^2\theta - \\ \left[ \begin{array}{l} [CD + A(B+nE)]n\sin^2\beta + \\ \left[ \begin{array}{l} C(A+nC) + \\ nB(B+nE) - AD \end{array} \right]\sin\beta\cos\beta(A+nC)]E\cos^2\beta \end{array} \right]\frac{\sin\theta\cos\theta}{E} + \\ \left[ \begin{array}{l} [A(A+nC) + D(D-nB)]\sin^2\beta + \\ [CD + A(B+nE)]\sin\beta\cos\beta + DE\cos^2\beta \end{array} \right]\frac{\cos^2\theta}{E} \end{array} \right\}$$

$$A = \frac{m}{2}(1-p)\sin 2\alpha \quad (35)$$

$$B = \frac{m}{2}[1 + p + (1-p)\cos 2\alpha] \quad (36)$$

$$C = \frac{1}{2}[1 - p^2 + (1+p^2-l)\cos 2\alpha]\sin 2\alpha \quad (37)$$

$$D = \frac{1}{8}(1 + p^2 - l)\sin^2 2\alpha - p \quad (38)$$

$$E = \frac{1}{8}[3 + l + 3p^2 + 4(1-p^2)\cos 2\alpha + (1+p^2-l)\cos 4\alpha] \quad (39)$$

$$l = \frac{2\beta_{12} + \beta_{66}}{\beta_{11}}; m = \sqrt{2p+l}; p = \sqrt{\frac{\beta_{22}}{\beta_{11}}} \quad (40)$$

$$\beta_{ij} = D_{ij} - \frac{D_{i3}D_{j3}}{D_{33}}(i, j = 1, 2, 3, 4, 5, 6) \quad (41)$$

where Dij is the compliance tensor in the global x,y coordinate system. It should be noted that the other expressions can be of a similar structure.

For a vertical circular borehole in an isotropic formation it can be shown that anisotropic formation equations such as equation (31) can be reduced to equation (42):

$$\sigma_{rr} = p_w$$

$$\sigma_{\theta\theta} = (S_H\theta + S_h p) - 2(S_H - S_h)\cos 2\theta - p_w$$

$$\sigma_{zz} = S_v - 2\nu(S_H - S_h)\cos 2\theta$$

$$\tau_{\theta z} = 0$$

$$\tau_{rz} = 0$$

$$\tau_{r\theta} = 0 \quad (42)$$

where $\sigma_{rr}$, $\sigma_{\theta\theta}$, $\sigma_{zz}$ are the normal stresses in the radial, azimuthal and vertical directions; and $\tau_{\theta z}$, $\tau_{rz}$, $\tau_{r\theta}$ are the corresponding shear stresses.

In an exemplary embodiment, the stress tensor can be converted to an effective stress tensor by subtracting pore pressure from the terms on the diagonal. The effective stress tensor can be manipulated to yield a set of three principal effective stresses as the Eigen values of the stress tensor. The method for finding the lower bound on safe mud weight, given well pressure $p_w$, involves an iteration whereby the borehole wall effective stresses can be iterated until a stability criterion can be fulfilled at the borehole. For example, where a yield function is equal to or greater than zero. In an exemplary embodiment, a similar method can be used for the upper bound until a failure criterion, such as exceeding a tensile strength, is satisfied.

In an exemplary embodiment, for isotropic formations, the failure lower bound can be found by iterating until a yield function M(σ') is equal to or greater than zero. The isotropic failure function or yield function M(σ') can be described by equation (43):

$$M = \left\{ J_2 \left[ 1 + C_1 J_3 \left( \frac{1}{J_2} \right)^{1.5} \right]^n + C_2 I_1^2 + C_3 I_1^4 \right\}^{0.5} + C_4 I_1 + C_5 I_1^2 - C_6 \quad (043)$$

where $C_1, C_2, C_3, C_4, C_5, C_6$ and n are typically in the range of from about 1.0 to about 2.0, from about 0.003 to about 0.007, from about $1 \times 10^{-8}$ m²/kN to about $2 \times 10^{-8}$ m²/kN, from about 0.1 to about 0.3, from about $3 \times 10^{-6}$ m²/kN to about $7 \times 10^{-6}$ m²/kN, from about 5 to about 50 kN/m² and from about 0.4 to about 0.7 respectively for specific rock types within different regions of the world.

The parameters $I_1, J_2, J_3$ are respectively the standard first stress invariant and the second and third principal deviatoric stress invariants calculated from the effective principal stress tensor. Similar considerations can apply to formations with anisotropic strength. For example, a quadratic strength based on the principal stresses ($\sigma_i$) will be of the form described by equation (44):

$$F_{ij}\sigma_i\sigma_j + F_i\sigma_i = 1 \quad (44)$$

and a quadratic strength based on principal strains ($\varepsilon_i$) can be of the form described by equation (45):

$$F_{ij}\varepsilon_i\varepsilon_j + F_i\varepsilon_i = 1 \quad (45)$$

The one or more equations can be solved by standard methods on single processor and/or multiprocessor systems, such as the computer 5 with reference to FIG. 1. In an exemplary embodiment, solving equations like equations (31) through (41) for each of the stress and shear components can be accomplished using one or more embodiments of the computer 5 with reference to FIG. 1. In an exemplary embodiment, solving equations (43) through (45) to determine the failure criteria and stability models can be accomplished using one or more embodiments of the computer 5 with reference to FIG. 1.

Prophetic Example

The foregoing discussion can be further described with reference to the following non-limiting, prophetic example. For simplicity and ease of description, only some of the calculations performed using the method and system are presented here.

In this prophetic example, at least three factors that can be controlled to optimize wellbore stability can be wellbore trajectory, mud weight, and mud chemistry. For this example, the trajectory of the wellbore is assumed to be vertical starting at the given surface location. Since mud chemistry is unknown at this time, only mud weight calculations are considered in this example. Furthermore, the analysis outlined in this example represents a proposed well location and relies upon data and/or measured results from existing wells to complete some of the assumptions in the calculation string. The magnitudes of material properties such as Young's modulus, Poisson's ratio, cohesive strength, and friction angle are obtained using calibration well data extrapolated to this location. The failure calculation is based on a modified Lade material model with 90° breakout angle for a vertical hole.

Figure 7:
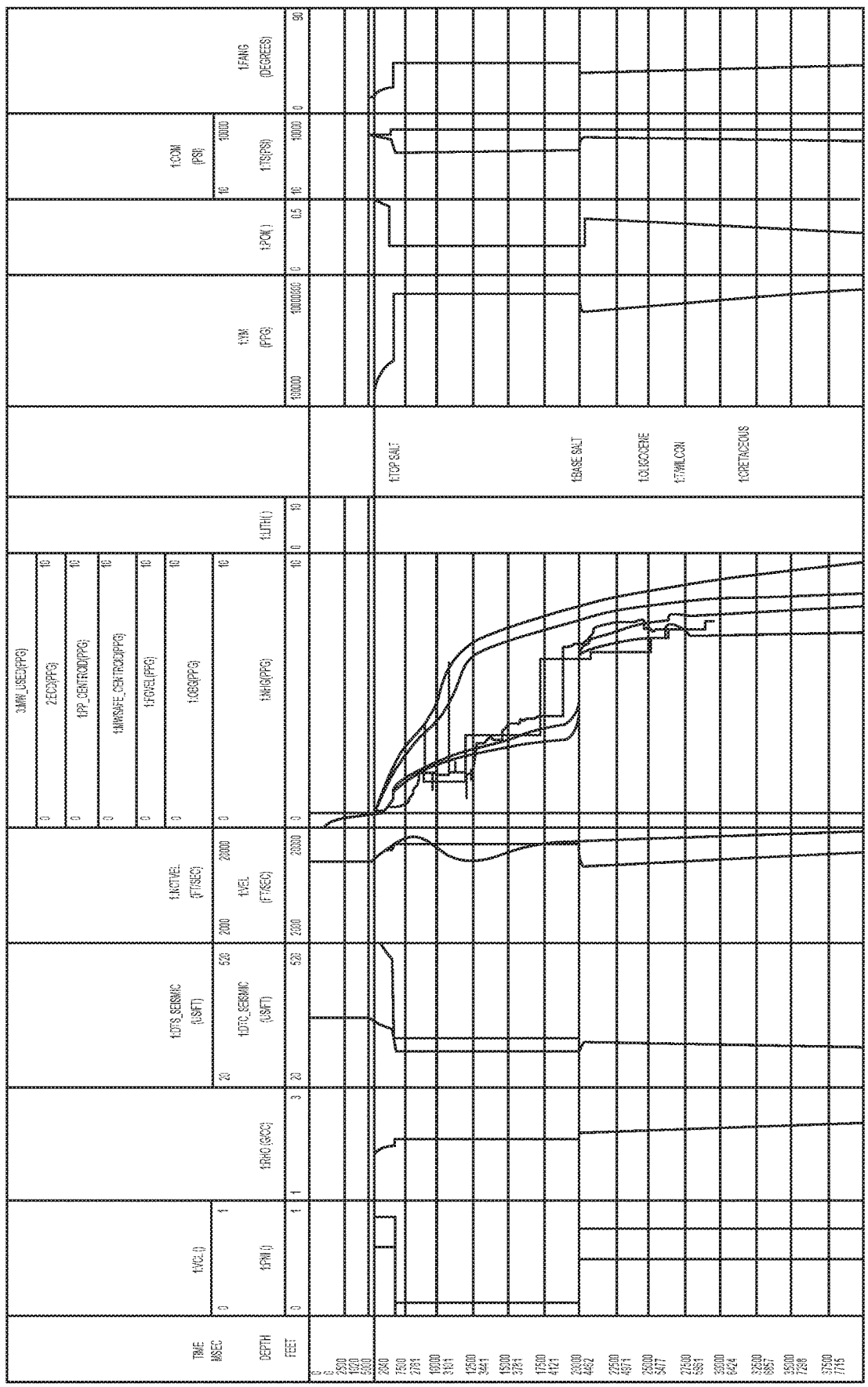
FIG. 7 illustrates the estimated wellbore stability profile for an example well.

FIG. 7 illustrates an estimated wellbore stability profile for an example well. Analysis techniques from the one or more embodiments described above, along with other known analysis techniques are used to perform the following assessments. Lower hemisphere and borehole azimuth plots are produced. For a 90-degree breakout angle at 30,000 feet, the lowest value for required mud weight is for a vertical hole and is calculated to be around 14.7 ppg. The highest value for the required mud weight is for a horizontal hole towards 66° azimuth or towards 246° azimuth and is calculated to be around 15.05 ppg.

Figure 8:
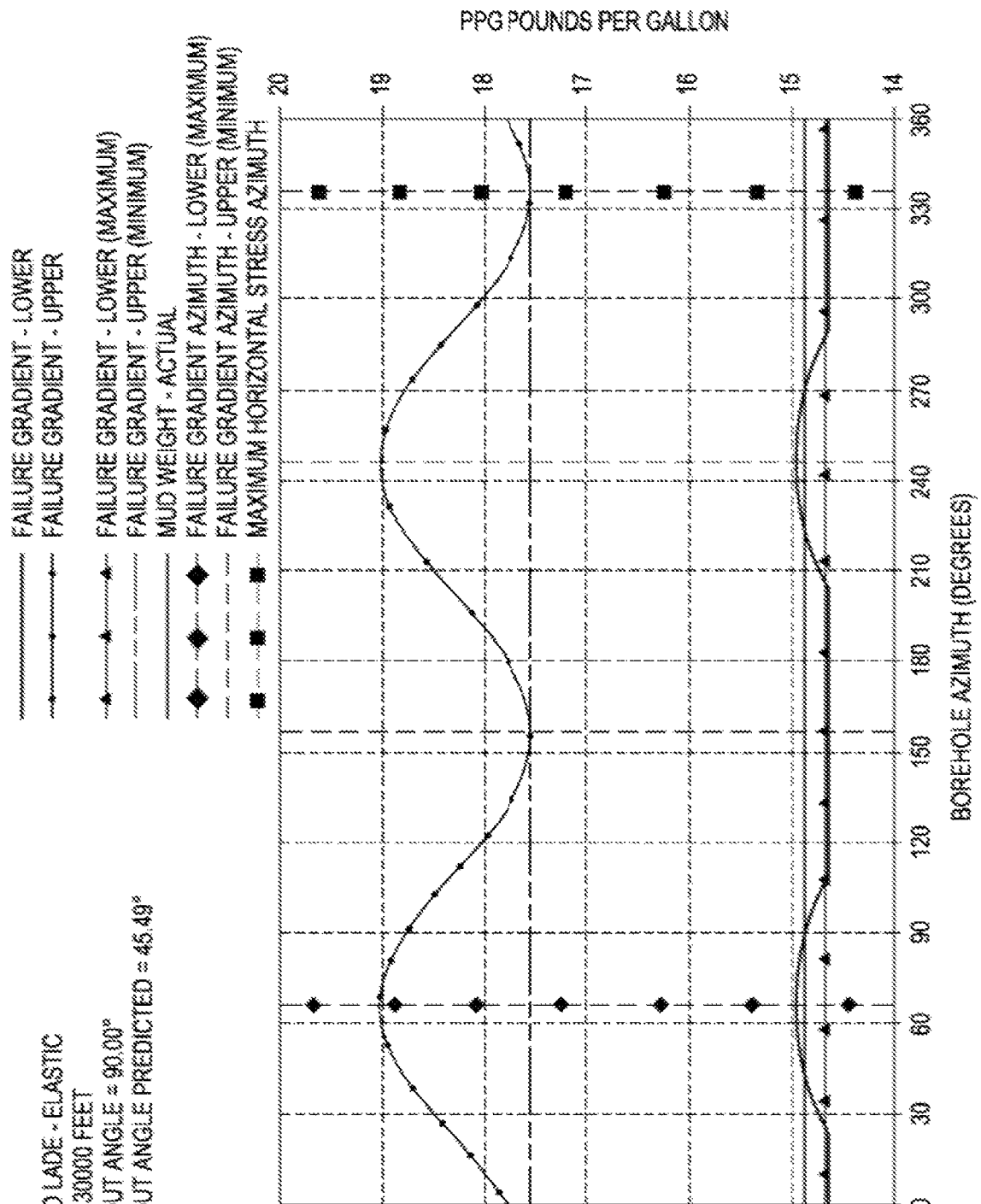
FIG. 8 illustrates the azimuthal variation around the borehole perimeter of lower and upper bounds on the mud weight for a depth of 30,000 feet for the example well.

FIG. 8 illustrates the azimuthal variation around the borehole perimeter of lower and upper bounds on the mud weight for a depth of 30,000 feet for the example well. Due to the nature of the elastic borehole model, the azimuthal variation is sinusoidal. The actual mud weight recommended is usually close to the lower bound to maximize the drilling rate.

Based on the results from the stability profile and azimuth plots, an interpretation is proposed. At depths shallower than salt base, very few wellbore stability problems are expected. Close to the salt base, the pore pressure ramps up rapidly, and this may lead to some wellbore stability issues unless the mud weight and equivalent circulating density (ECD) is regulated carefully. Prudent ECD accounting for environmental parameters such as pressure and temperature is required below salt base as the mud window can be less than 1 ppg. Since centroid effect is possible due to the oil column below salt, the mud weight margin is estimated to drop by 40%. Also, due to the narrower margin available, rock properties should be updated with real-time data from well logs, leak-off tests, core samples and an updated wellbore stability analysis should be performed. For purposes of understanding embodiments of the present disclosure, the centroid effect is generally defined as a hydrodynamic effect where fluid filled reservoir rocks have abnormal pore pressures owing to one or both of the following causes: 1) fluid pressure being piped (or siphoned) from deeper (or shallower) formations that are in communication with the reservoir and/or 2) fluid density differential where the reservoir fluid is less dense than the surrounding fluids and induces higher pressures because of buoyancy. In order to estimate the centroid effect at this particular location, analysis of the reservoir penetrated by the wellbore and the overall geometry of the reservoir is performed. The analysis includes the generation of centroid and buoyancy curves, centroid parameters, gas zone parameters, oil zone parameter and water zone parameters. The centroid effects are analyzed at 28,000 feet and 31,100 feet. The centroid depth of 28,000 feet is identified as giving reasonable estimates.

Figure 9:
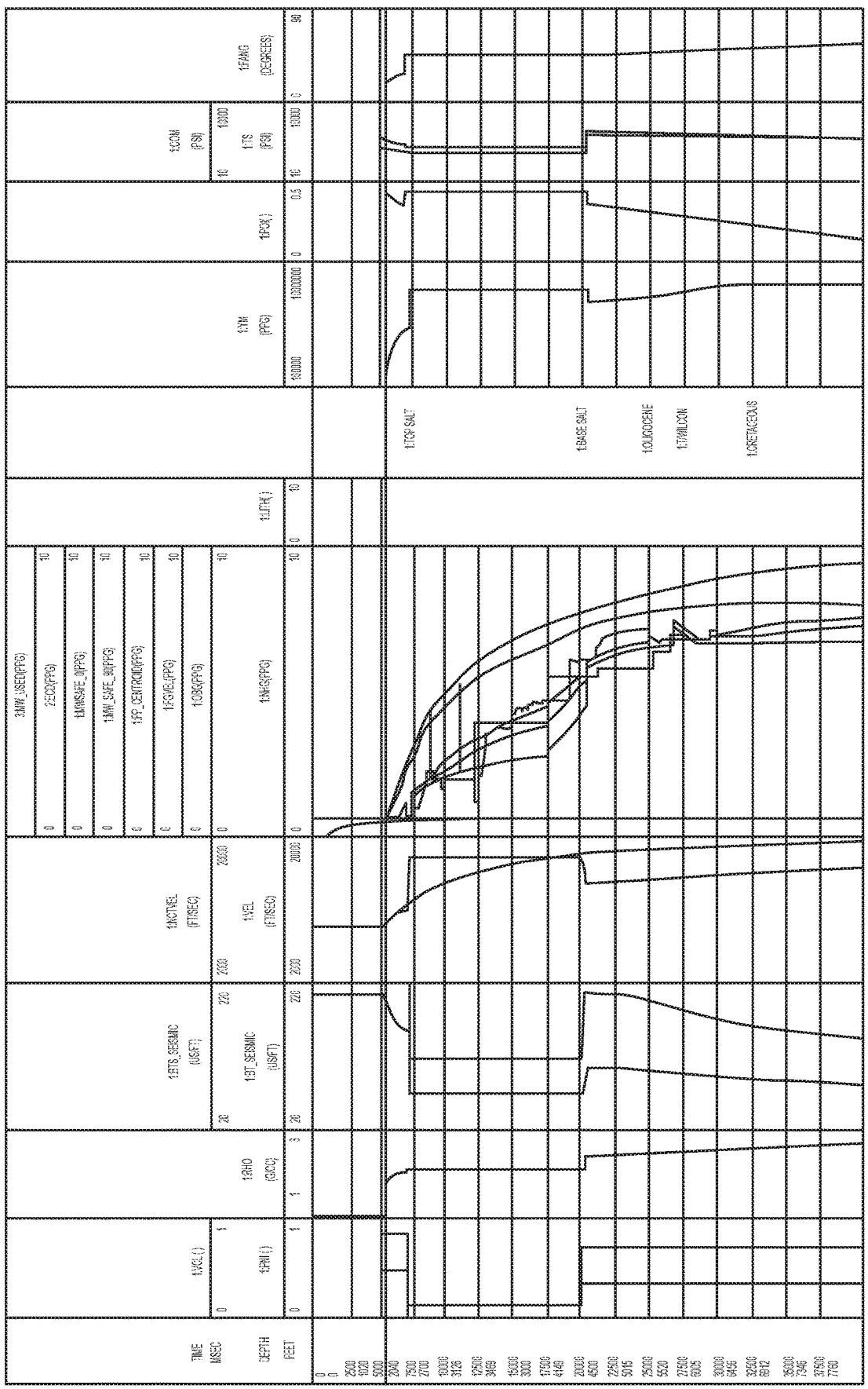
FIG. 9 illustrates the full set of results for safe mud weight for breakout angles of 0 degrees and 90 degrees for the example well.

FIG. 9 illustrates the full set of results for safe mud weight for breakout angles of 0 degrees and 90 degrees for the example well. The centroid results identified a zone with an assumed centroid depth of 28,000 ft as possibly presenting hydrodynamically induced pressures. The corresponding worst-case mud weight windows suggest that it will be possible to reach the objectives with cautious planning. The worst-case mud weight windows are calculated to be: Pore Pressure Gradient: 15.1 PG, Fracture Gradient: 15.9 PPG, and Mud Weight Window: 0.8 PPG.

Based on the forgoing analysis, kick tolerance can be assessed. The greatest risk is determined to be in the subsalt pressure transition zones, below 20,130 ft, 23,000 ft and 20,040 ft respectively. On exiting the salt, the mud weight window is expected to narrow to around 1 ppg without the centroid effect and to around 0.65 ppg, at the worst point, with the centroid effect. Leak-off tests are recommended prior to drilling this interval. At greater depths up to 31,500 ft, a narrow but sufficient mud weight window is determined to exist to drill safely without risk of formation damage caused by high ECD's. The interval below 32,500 ft shows a narrowing of the mud weight window tapering below 1 ppg. If an oil column of any height greater than 2,500 ft exists, the interval below 32,500 ft may have to be re-evaluated.

Deepening the placement of the casing above salt can improve the window over the interval below. This increase may permit a delay in the deployment of the next casing string and thus increase the mud weight window. However, because of the fairly constant pore pressure and fracture gradients below 28,000 ft, no meaningful increase in the mud weight window can be achieved by delaying the deployment of subsequent string.

Various terms have been defined herein, and to the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted. Any spatial references used herein, such as, "upper," "lower," "above," "below," "between," "vertical," "horizontal," "angular," "upward," "downward," "side-to-side," "left-to-right," "right-to-left," "top-to-bottom," "bottom-to-top," "left," "right," etc., are for the purpose of illustration only and do not limit the specific orientation or location of the structure described above. Additionally, in several exemplary embodiments, one or more of the operational events or steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

While the foregoing is directed to embodiments of the present disclosure, other and further embodiments of the disclosure may be devised without departing from the basic scope thereof.

What is claimed is:

1. A method for developing a subterranean geomechanical model of a complex geological environment, the method comprising:
   calculating, using one or more processors, a pore pressure field, a stress field, a geomechanics property field, and a geological structure field from a geological concept model constructed using at least one of historical data and real-time data obtained at one or more locations within the complex geological environment;
   geostatistically interpolating, using the one or more processors, scalars, vectors, and tensors from the calculated pore pressure field, the calculated stress field, the calculated geomechanics property field, and the calculated geological structure field to construct a geostatistical geomechanical model of the geological environment, wherein geostatistically interpolating the tensors comprises:
      decomposing the tensors into one or more components,
      propagating the one or more components to another location within the complex geological environment, and
      combining the one or more components at the another location within the complex geological environment to form a new tensor representative of one or more estimated properties of the another location; and
   applying the geostatistical geomechanical model to: targeting reservoirs, preparing well drilling, or performing a local wellbore stability analysis for proposed wellbore trajectories.

2. The method of claim 1, further comprising:
   extracting local parameters along a proposed wellbore from the geostatistical geomechanical model, the proposed wellbore corresponding to the another location within the complex geological environment; and
   performing a local wellbore stability analysis along a trajectory of the proposed wellbore.

3. The method of claim 2, further comprising determining at least one of a local wellbore pore pressure, a fracture gradient, an overburden gradient, a rock mechanical property, and an in-situ stress along the trajectory of the proposed wellbore from a global model generated during the local wellbore stability analysis.

4. The method of claim 2, wherein performing the local wellbore stability analysis along the trajectory of the proposed wellbore further comprises:
   calculating stress tensors around the proposed wellbore; and
   converting the stress tensors to a borehole cylindrical system.

5. The method of claim 1, wherein displaying the calibrated geostatistical geomechanical model comprises displaying the calibrated geostatistical geomechanical model on a computer screen or printing the calibrated geostatistical geomechanical model for the user.

6. A system for generating a subterranean geomechanical model, the system comprising:
   a local central processing unit in communication with an input device;
   an interface in communication with the local central processing unit and configured to communicate with a remote processor and a database; and
   a memory unit in communication with the local central processing unit, the memory unit containing an operating system, a geomechanical model generation agent, and an operational parameters determination agent;
   a calculating module configured to calculate a pore pressure field, a stress field, a geomechanics property field, and a geological structure field from a geological concept model using at least one of historical data and real-time data obtained at one or more locations within the complex geological environment;
   a constructing module configured to construct a geostatistical geomechanical model of a geological environment from the calculated pore pressure field, the calculated stress field, the calculated geomechanics property field, and the calculated geological structure field, wherein the constructing module constructs the geostatistical geomechanical model of the geological environment by geostatistically interpolating, using the one or more processors, scalars, vectors, and tensors from the calculated pore pressure field, the calculated stress field, the calculated geomechanics property field, and the calculated geological structure field, wherein geostatistically interpolating the tensors comprises:
      decomposing the tensors into one or more components,
      propagating the one or more components to another location, and
      combining the one or more components at the another location to form a new tensor representative of one or more estimated properties of the another location; and an application module for apply the geostatistical geomechanical model to: targeting reservoirs, preparing well drilling, or performing a local wellbore stability analysis for proposed wellbore trajectories.

7. The system of claim 6, wherein the geomechanical model generation agent comprises a software code set configured to be executed by the local central processing unit to construct a subterranean geomechanical model describing geomechanics of a complex geological environment.

8. The system of claim 7, wherein the geomechanical model generation agent and the operational parameters determination agent comprise software code configured to be executed by the local central processing unit to generate the subterranean geomechanical model.

9. The system of claim 6, wherein the operational parameters determination agent is configured to determine wellbore operational parameters required to maintain borehole stability in geomechanically modeled environments during different operational phases.

10. The system of claim 6, wherein the constructing module is further configured to:
extract local parameters along a proposed wellbore from the calibrated geostatistical geomechanical model, the proposed wellbore corresponding to the new location; and
perform a local wellbore stability analysis along a trajectory of the proposed wellbore.

11. The system of claim 10, wherein the constructing module is further configured to calculate stress tensors around the proposed wellbore and convert the calculated stress tensors to a borehole cylindrical system.

12. A non-transitory computer readable medium comprising a computer program, that when executed by one or more processors, cause the one or more processors to perform operations for developing a subterranean geomechanical model of a complex geological environment, wherein the operations comprise:
calculating, using one or more processors, a pore pressure field, a stress field, a geomechanics property field, and a geological structure field from a geological concept model using at least one of historical data and real-time data obtained at one or more locations within the complex geological environment;
geostatistically interpolating, using the one or more processors, scalars, vectors, and tensors from the calculated pore pressure field, the calculated stress field, the calculated geomechanics property field, and the calculated geological structure field to construct a geostatistical geomechanical model of the geological environment, wherein geostatistically interpolating the tensors comprises:
decomposing the tensors into one or more components,
propagating the one or more components to another location within the complex geological environment, and
combining the one or more components at the another location within the complex geological environment to form a new tensor representative of one or more estimated properties of the another location; and
applying the geostatistical geomechanical model to: targeting reservoirs, preparing well drilling, or performing a local wellbore stability analysis for proposed wellbore trajectories.

13. The non-transitory computer readable medium of claim 12, wherein the operations for constructing the geostatistical geomechanical model further comprise:
extracting local parameters along a proposed wellbore from the calibrated geostatistical geomechanical model, the proposed wellbore corresponding to the another location within the complex geological environment; and
performing a local wellbore stability analysis along a trajectory of the proposed wellbore.

14. The non-transitory computer readable medium of claim 13, wherein the operations for extracting local parameters further comprise determining at least one of a local wellbore pore pressure, a fracture gradient, an overburden gradient, a rock mechanical property, and an in-situ stress along the trajectory of the proposed wellbore from a global model generated during the local wellbore stability analysis.

15. The non-transitory computer readable medium of claim 13, wherein the operations for performing the local wellbore stability analysis along the proposed wellbore trajectory further comprise:
calculating stress tensors around the proposed wellbore; and
converting the stress tensors to a borehole cylindrical system.

16. The non-transitory computer readable medium of claim 12, wherein displaying the calibrated geostatistical geomechanical model comprises displaying the calibrated geostatistical geomechanical model on a computer screen or printing the calibrated geostatistical geomechanical model for the user.

17. The method of claim 1, further comprising calibrating the geostatistical geomechanical model of the geological environment using wellbore stability analyses for existing wells.

18. The system of claim 6, further comprising a calibrating module configured to calibrate the geostatistical geomechanical model of the geological environment using wellbore stability analyses for existing wells.

19. The non-transitory computer readable medium of claim 12, the operations further comprising calibrating the geostatistical geomechanical model of the geological environment using wellbore stability analyses for existing wells.

* * * * *

UNITED STATES PATENT AND TRADEMARK OFFICE
CERTIFICATE OF CORRECTION

PATENT NO. : 10,528,681 B2  
APPLICATION NO. : 13/732511  
DATED : January 7, 2020  
INVENTOR(S) : Elan Yogeswaren Page 1 of 1

It is certified that error appears in the above-identified patent and that said Letters Patent is hereby corrected as shown below:

In the Specification

At Column 8, Line number 46, delete "pergallon" and replace with --per gallon--.

At Column 8, Line number 48, delete "contants" and replace with --constants--.

At Column 9, Line number 56, delete "subscript -1" and replace with --subscript i-1--.

At Column 10, Line number 5, delete "(LOTS)" and replace with --(LOTs)--.

At Column 11, Line number 66, delete "ration" and replace with --ratio--.

At Column 14, Line number 51, delete "$\lambda_t...\lambda_n$" and replace with --$\lambda_1...\lambda_n$--.

At Column 17, Line number 16, delete "$\sigma^R_{xz}$" and replace with --$\sigma^R_{xx}$--.

At Column 17, Line number 40, delete "$\tau_{rr}$" and replace with --$\sigma_{rr}$--.

At Column 18, Line number 42, equation 42, delete the portion of the equation reading "$\sigma_{zz} = S_v = 2v(S_H - S_h)cos2\theta$" and replace with --$\sigma_{zz} = S_v - 2v(S_H - S_h)cos2\theta$--.

Signed and Sealed this  
Seventh Day of April, 2020

Andrei Iancu  
*Director of the United States Patent and Trademark Office*